(12) United States Patent
Roelse et al.

(10) Patent No.: US 11,403,381 B2
(45) Date of Patent: Aug. 2, 2022

(54) BIOMETRIC AUTHENTICATION

(71) Applicant: IRDETO B.V., Hoofddorp (NL)

(72) Inventors: Petrus Lambertus Adrianus Roelse, Hoofddorp (NL); Shufei He, Hoofddorp (NL)

(73) Assignee: Irdeto B.V., Hoofddorp (NL)

(*) Notice: Subject to any disclaimer, the term of this patent is extended or adjusted under 35 U.S.C. 154(b) by 141 days.

(21) Appl. No.: 16/768,751

(22) PCT Filed: May 28, 2020

(86) PCT No.: PCT/EP2020/064920
§ 371 (c)(1),
(2) Date: Jun. 1, 2020

(87) PCT Pub. No.: WO2021/239239
PCT Pub. Date: Dec. 2, 2021

(65) Prior Publication Data
US 2022/0121732 A1    Apr. 21, 2022

(51) Int. Cl.
| | | |
|---|---|---|
| *G06F 21/31* | (2013.01) | |
| *G06F 21/32* | (2013.01) | |
| *H04L 9/32* | (2006.01) | |

(52) U.S. Cl.
CPC .............. *G06F 21/32* (2013.01); *G06F 21/31* (2013.01); *H04L 9/32* (2013.01); *H04L 9/3231* (2013.01)

(58) Field of Classification Search
CPC . G06F 21/32; G06F 21/31; H04L 9/32; H04L 9/3231
See application file for complete search history.

(56) References Cited

U.S. PATENT DOCUMENTS 10,467,394 B2 * 11/2019 Asulin ................... G06F 21/316
10,764,281 B1 * 9/2020 Gaeta ................... H04L 63/0861
(Continued)

FOREIGN PATENT DOCUMENTS

| WO | WO-2016001657 A1 * | 1/2016 | .............. G09C 1/00 |
|---|---|---|---|
| WO | WO-2020144510 A1 * | 7/2020 | ............. G06F 21/32 |

OTHER PUBLICATIONS

Wikipedia, 'Mixture Model', pp. 1-14, last edited Apr. 13, 2020 retrieved from: https://en.wikipedia.org/w/index.php?title=Mixture_model&oldid=950749555.
(Continued)

*Primary Examiner* — Jayesh M Jhaveri
(74) *Attorney, Agent, or Firm* — Rimon PC; Marc Kaufman

(57) ABSTRACT

A method of performing biometric authentication for a first user, the method comprising: performing one or more first tests, wherein for each first test, performing said first test comprises: obtaining a respective first input for said first test based on one or more biometric characteristics of the first user; determining that the first user is not a predetermined user when a respective first log-likelihood ratio for a first likelihood and a second likelihood does not exceed a respective first threshold for said first test, wherein the first likelihood is a likelihood of obtaining the respective first input based on a first model in which input is obtained from the predetermined user, and wherein the second likelihood is a likelihood of obtaining the respective first input based on a second model in which input is obtained from one or more users other than the predetermined user; determining that the first user is the predetermined user when the respective first log-likelihood ratio exceeds a respective second threshold for said first test, the respective second threshold greater than the respective first threshold; and when the respective first log-likelihood ratio exceeds the respective first threshold and the respective first log-likelihood ratio does not exceed the respective second threshold, either (a) determining to perform a further first test when a number of times that the first test has been performed is less than a predetermined maximum number of times or (b) determining to perform a second test when the number of times that the first test has been performed equals the predetermined maximum number of times; wherein performing the second test comprises: obtaining a second input for the second test based on the one or more biometric characteristics of the first user; and determining that the first user is the predetermined user when a second log-likelihood ratio for a third likelihood and a fourth likelihood exceeds a third threshold, wherein the third likelihood is a likelihood of receiving the respective
(Continued)

second input based on the first model, and wherein the fourth likelihood is a likelihood of receiving the second input based on the second model; determining that the first user is not the predetermined user when the second log-likelihood ratio does not exceed the third threshold.

21 Claims, 6 Drawing Sheets

(56) References Cited

U.S. PATENT DOCUMENTS

| | | | |
|---|---|---|---|
| 2017/0242995 A1* | 8/2017 | Bassenye-Mukasa | ................... G06F 16/24575 |
| 2019/0295554 A1* | 9/2019 | Lesso | ................... G10L 17/06 |
| 2020/0228339 A1* | 7/2020 | Barham | ................... G06N 7/005 |

OTHER PUBLICATIONS

Douglas A. Reynolds, et al., "Speaker verification using adapted Gaussian mixture models," Digital Signal Processing 10, pp. 19-41, Jan. 1, 2000, available at: http://citeseerx.ist.psu.edu/viewdoc/download?doi=10.1.1.117.338&rep=rep1&type=pdf.

A. P. Dempster, et al., "Maximum likelihood from incomplete data via the EM algorithm," Journal of the Royal Statistical Society. Series B (Methodological), vol. 39, No. 1. (Jan. 1, 1977), pp. 1-38. Available at: http://links.jstor.org/sici?sici=0035-9246%281977%2939%3A1%3C1%3AMLFIDV%3E2.0.CO%3B2-Z.

L.R. Rabiner, et al., "Fundamentals of Speech Recognition", Englewood Cliffs, N.J., PTR Prentice Hall, Jan. 1, 1993, pp. 1-386 (ch. 1-6).

* cited by examiner

BIOMETRIC AUTHENTICATION

RELATED APPLICATIONS

This application is a national stage application of PCT/EP2020/064920 filed May 28, 2020, the disclosures of which are incorporated herein by reference in their entirety.

FIELD OF THE INVENTION

The present invention relates to methods of performing biometric authentication, and systems and computer programs adapted to carry out such methods of performing biometric authentication.

BACKGROUND OF THE INVENTION

Biometric authentication is a security process that uses biological or biometric characteristics of a user (or person) $U_1$ to verify (or authenticate/test/check) the identity of that user $U_1$. Many methods of performing such biometric authentication are known. Such authentication may be based, for example, on one or more of: facial characteristics; voice characteristics; fingerprints; eye characteristics (e.g. iris or retina patterns); etc. During the biometric authentication, an input X is obtained from (or is provided by) the user $U_1$ whose identity is to be authenticated, where the input X is based on (or represents) one or more biological or biometric characteristics of the user $U_1$—this input X could be obtained or derived, for example, based on one or more of: one or more captured images of the user's face or eye(s); fingerprint data obtained from a fingerprint scanner; capture/recording of the user's voice (which may or may not be predetermined words spoken); etc. depending on which biometric characteristics are to be used by the authentication system. The objective of the biometric authentication is then to determine whether the input X was provided by (or is based on or relates to or was obtained from) a predetermined user $U_D$, e.g. whether the captured image(s) of the user's face or eye(s) corresponds to the face or eye(s) of the predetermined user $U_D$; whether the obtained fingerprint data corresponds to one or more fingerprints of the predetermined user $U_D$; whether the captured voice corresponds to the voice of the predetermined user $U_D$; etc. If it is determined that the user being tested, $U_1$, is the predetermined user $U_D$, then the user $U_1$ may be processed accordingly as if they were the predetermined user $U_D$ (e.g. pass a passport check; be granted access to a facility or to data or to a device; be permitted to perform certain actions; etc.); if it is determined that the user being tested, $U_1$, is not the predetermined user $U_D$, then the user $U_1$ may be processed accordingly as if they were not the predetermined user $U_D$ (e.g. fail a passport check; be denied access to a facility or to data or to a device; be prevented from performing certain actions; etc.). For example, a device (e.g. a computer or smartphone) may belong to a particular person $U_D$, and it may be desirable to perform biometric authentication of a person $U_1$ wishing to login or make use of the device to check whether that person $U_1$ is the owner $U_D$, and then allow only the authenticated owner $U_D$ to login and make use of the device.

Associated with biometric authentication are false rejections and false acceptances. A false rejection occurs if the biometric authentication does not accept a correctly claimed identity, i.e. the user $U_1$ being tested is indeed the predetermined user $U_D$ but the biometric authentication incorrectly concludes that the user $U_1$ being tested is not the predetermined user $U_D$. A false acceptance occurs if the biometric authentication accepts an incorrectly claimed identity, i.e. the user $U_1$ being tested is not the predetermined user $U_D$ but the biometric authentication incorrectly concludes that the user $U_1$ being tested is the predetermined user $U_D$. False rejections relate to the (in)convenience experienced by legitimate users—after a false rejection, the legitimate user may, for example, need to repeat the biometric authentication or liaise with a system administrator. False acceptances relate to the security of the biometric authentication—after a false acceptance, an unauthorized or incorrect user may, for example, be able to access data or devices that they may not normally be able/allowed to access, or may be able perform tasks that they may not be normally able/allowed to perform.

It would be desirable to provide a method of conducting biometric authentication that provides for low rates of both false rejections and false acceptances.

SUMMARY OF THE INVENTION

According to a first aspect of the invention, there is provided a method of performing biometric authentication for a first user, the method comprising:

performing one or more first tests, wherein for each first test, performing said first test comprises:
  obtaining a respective first input for said first test based on one or more biometric characteristics of the first user;
  determining that the first user is not a predetermined user when a respective first log-likelihood ratio for a first likelihood and a second likelihood does not exceed a respective first threshold for said first test, wherein the first likelihood is a likelihood of obtaining the respective first input based on a first model in which input is obtained from the predetermined user, and wherein the second likelihood is a likelihood of obtaining the respective first input based on a second model in which input is obtained from one or more users other than the predetermined user;
  determining that the first user is the predetermined user when the respective first log-likelihood ratio exceeds a respective second threshold for said first test, the respective second threshold greater than the respective first threshold; and
  when the respective first log-likelihood ratio exceeds the respective first threshold and the respective first log-likelihood ratio does not exceed the respective second threshold, either (a) determining to perform a further first test when a number of times that the first test has been performed is less than a predetermined maximum number of times or (b) determining to perform a second test when the number of times that the first test has been performed equals the predetermined maximum number of times;
wherein performing the second test comprises:
  obtaining a second input for the second test based on the one or more biometric characteristics of the first user; and
  determining that the first user is the predetermined user when a second log-likelihood ratio for a third likelihood and a fourth likelihood exceeds a third threshold, wherein the third likelihood is a likelihood of receiving the respective second input based on the first model, and wherein the fourth likelihood is a likelihood of receiving the second input based on the second model;

determining that the first user is not the predetermined user when the second log-likelihood ratio does not exceed the third threshold.

In some embodiments of the first aspect, for each first test, the respective first log-likelihood ratio is $r(X^{(j)})=\log p(X^{(j)}|\lambda_g)-\log p(X^{(j)}|\lambda_i)$, where $X^{(j)}$ is the respective first input for said first test, $\lambda_g$ is the first model and $\lambda_i$ the second model. In such embodiments, for each first test, determining that the first user is not the predetermined user when the respective first log-likelihood ratio for the first likelihood and the second likelihood does not exceed the respective first threshold may comprise one of: (a) calculating $r(X^{(j)})$ and determining that the first user is not the predetermined user if $r(X^{(j)})<\theta_L^{(j)}$, where $\theta_L^{(j)}$ is a respective predetermined threshold for the first test; or (b) calculating $$\frac{p(X^{(j)}|\lambda_g)}{p(X^{(j)}|\lambda_i)}$$

and determining that the first user is not the predetermined user if $$\frac{p(X|\lambda_g)}{p(X|\lambda_i)} < e^{\theta_L^{(j)}},$$

where $\theta_L^{(j)}$ is a respective predetermined threshold for the first test; or (c) calculating a metric based on a ratio between the first likelihood and the second likelihood and comparing the metric to a threshold based on the respective first threshold. Additionally or alternatively, in such embodiments, for each first test, determining that the first user is the predetermined user when the respective first log-likelihood ratio exceeds the respective second threshold may comprise one of: (a) calculating r(XU)) and determining that the first user is the predetermined user if $r(X^{(j)})>\theta_R^{(j)}$, where $\theta_R^{(j)}$ is a respective predetermined threshold for the first test; or (b) calculating $$\frac{p(X^{(j)}|\lambda_g)}{p(X^{(j)}|\lambda_i)}$$

and determining that the first user is the predetermined user if $$\frac{p(X^{(j)}|\lambda_g)}{p(X^{(j)}|\lambda_i)} > e^{\theta_R^{(j)}},$$

where $\theta_R^{(j)}$ is a respective predetermined threshold for the first test; or (c) calculating a metric based on a ratio between the first likelihood and the second likelihood and comparing the metric to a threshold based on the respective second threshold.

In some embodiments of the first aspect, the second log-likelihood ratio is $r(X^{(N)})=\log p(X^{(N)}|\lambda_g)-\log p(X^{(N)}|\lambda_i)$, where $X^{(N)}$ is the second input, $\lambda_g$ is the first model and $\lambda_i$ the second model. In such embodiments, determining that the first user is the predetermined user when the second log-likelihood ratio for the third likelihood and the fourth likelihood exceeds the third threshold may comprise one of: (a) calculating $r(X^{(N)})$ and determining that the first user is the predetermined user if $r(X^{(N)})>\theta^{(N)}$, where $\theta^{(N)}$ is a predetermined threshold; or (b) calculating $$\frac{p(X^{(N)}|\lambda_g)}{p(X^{(N)}|\lambda_i)}$$

and determining that the first user is the predetermined user if $$\frac{p(X^{(N)}|\lambda_g)}{p(X^{(N)}|\lambda_i)} > e^{\theta^{(N)}},$$

where $\theta^{(N)}$ is a predetermined threshold; or (c) calculating a metric based on a ratio between the third likelihood and the fourth likelihood and comparing the metric to a threshold based on the third threshold.

In some embodiments of the first aspect, the one or more biometric characteristics are based on one or more of: a face of the first user; a voice of the first user; one or more fingerprints of the first user; one or more eyes of the first user.

According to a second aspect of the invention, there is provided a system arranged to perform biometric authentication for a first user, the system adapted to:

perform one or more first tests, wherein for each first test, performing said first test comprises:
  obtaining a respective first input for said first test based on one or more biometric characteristics of the first user;
  determining that the first user is not a predetermined user when a respective first log-likelihood ratio for a first likelihood and a second likelihood does not exceed a respective first threshold for said first test, wherein the first likelihood is a likelihood of obtaining the respective first input based on a first model in which input is obtained from the predetermined user, and wherein the second likelihood is a likelihood of obtaining the respective first input based on a second model in which input is obtained from one or more users other than the predetermined user;
  determining that the first user is the predetermined user when the respective first log-likelihood ratio exceeds a respective second threshold for said first test, the respective second threshold greater than the respective first threshold; and
  when the respective first log-likelihood ratio exceeds the respective first threshold and the respective first log-likelihood ratio does not exceed the respective second threshold, either (a) determining to perform a further first test when a number of times that the first test has been performed is less than a predetermined maximum number of times or (b) determining to perform a second test when the number of times that the first test has been performed equals the predetermined maximum number of times;
wherein performing the second test comprises:
  obtaining a second input for the second test based on the one or more biometric characteristics of the first user; and
  determining that the first user is the predetermined user when a second log-likelihood ratio for a third likelihood and a fourth likelihood exceeds a third threshold, wherein the third likelihood is a likelihood of receiving the respective second input based on the first model, and wherein the fourth likelihood is a likelihood of receiving the second input based on the second model;

determining that the first user is not the predetermined user when the second log-likelihood ratio does not exceed the third threshold.

In some embodiments of the second aspect, for each first test, the respective first log-likelihood ratio is $r(X^{(j)})=\log p(X^{(j)}|\lambda_g)-\log p(X^{(j)}|\lambda_i)$, where $X^{(j)}$ is the respective first input for said first test, $\lambda_g$ is the first model and $\lambda_i$ the second model. In such embodiments, for each first test, determining that the first user is not the predetermined user when the respective first log-likelihood ratio for the first likelihood and the second likelihood does not exceed the respective first threshold may comprise one of: (a) calculating $r(X^{(j)})$ and determining that the first user is not the predetermined user if $r(X^{(j)})<\theta_L^{(j)}$, where $\theta_L^{(j)}$ is a respective predetermined threshold for the first test; or (b) calculating $$\frac{p(X^{(j)}|\lambda_g)}{p(X^{(j)}|\lambda_i)}$$

and determining that the first user is not the predetermined user if $$\frac{p(X|\lambda_g)}{p(X|\lambda_i)} < e^{\theta_L^{(j)}},$$

where $\theta_L^{(j)}$ is a respective predetermined threshold for the first test; or (c) calculating a metric based on a ratio between the first likelihood and the second likelihood and comparing the metric to a threshold based on the respective first threshold. Additionally or alternatively, in such embodiments, for each first test, determining that the first user is the predetermined user when the respective first log-likelihood ratio exceeds the respective second threshold may comprise one of: (a) calculating $r(X^{(j)})$ and determining that the first user is the predetermined user if $r(X^{(j)})>\theta_R^{(j)}$, where $\theta_R^{(j)}$ is a respective predetermined threshold for the first test; or (b) calculating $$\frac{p(X^{(j)}|\lambda_g)}{p(X^{(j)}|\lambda_i)}$$

and determining that the first user is the predetermined user if $$\frac{p(X^{(j)}|\lambda_g)}{p(X^{(j)}|\lambda_i)} > e^{\theta_R^{(j)}},$$

where $\theta_R^{(j)}$ is a respective predetermined threshold for the first test; or (c) calculating a metric based on a ratio between the first likelihood and the second likelihood and comparing the metric to a threshold based on the respective second threshold.

In some embodiments of the second aspect, the second log-likelihood ratio is $r(X^{(N)})=\log p(X^{(N)}|\lambda_g)-\log p(X^{(N)}|\lambda_i)$, where $X^{(N)}$ is the second input, $\lambda_g$ is the first model and $\lambda_i$ the second model. In such embodiments, determining that the first user is the predetermined user when the second log-likelihood ratio for the third likelihood and the fourth likelihood exceeds the third threshold may comprise one of: (a) calculating $r(X^{(N)})$ and determining that the first user is the predetermined user if $r(X^{(N)})>\theta^{(N)}$, where $\theta^{(N)}$ is a predetermined threshold; or (b) calculating $$\frac{p(X^{(N)}|\lambda_g)}{p(X^{(N)}|\lambda_i)}$$

and determining that the first user is the predetermined user if $$\frac{p(X^{(N)}|\lambda_g)}{p(X^{(N)}|\lambda_i)} > e^{\theta^{(N)}},$$

where $\theta^{(N)}$ is a predetermined threshold; or (c) calculating a metric based on a ratio between the third likelihood and the fourth likelihood and comparing the metric to a threshold based on the third threshold.

In some embodiments of the second aspect, the one or more biometric characteristics are based on one or more of: a face of the first user; a voice of the first user; one or more fingerprints of the first user; one or more eyes of the first user.

According to a third aspect of the invention, there is provided a computer program which, when executed by one or more processors, causes the one or more processors to carry out the method according to the first aspect or any embodiment thereof. The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

Figure 1:
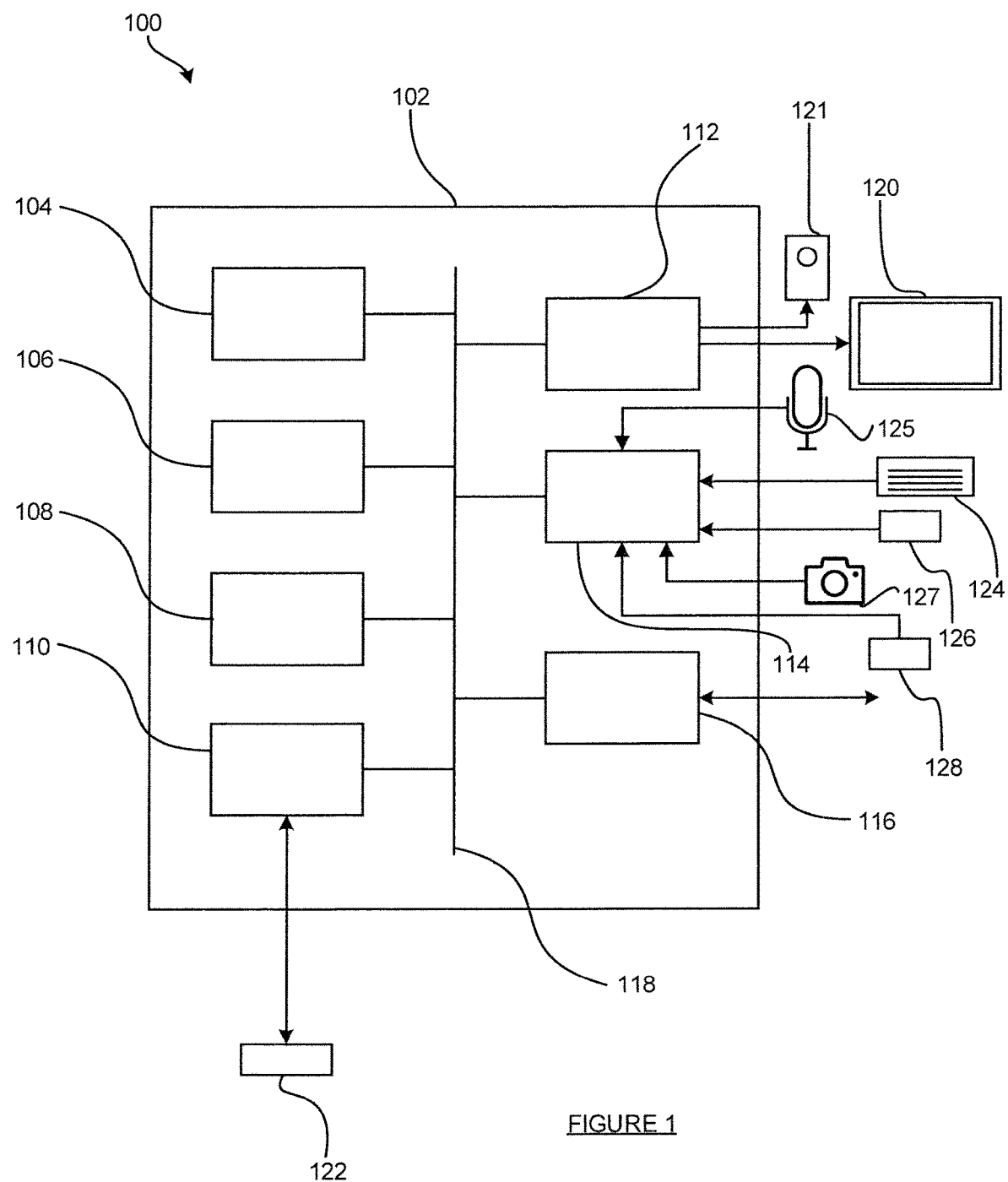
FIG. 1 schematically illustrates an example of a computer system.

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—Underlying Mathematical Basis

As mentioned, the objective of biometric authentication is to determine, given an input X that is provided by (or that originated from) a first user $U_1$ and that is based on (or represents) one or more biological or biometric characteristics of the first user $U_1$, whether the first user $U_1$ is a predetermined or specific user $U_D$. This may be formulated as a hypothesis test in which the null hypothesis $H_0$ is that X originated from (or was provided by or is based on or corresponds to) the predetermined user $U_D$, and in which the alternative hypothesis $H_1$ is that X did not originate from (or was not provided by or is not based on or does not correspond to) the predetermined user $U_D$. One possible test is to compare the likelihoods $p(X|H_0)$ and $p(X|H_1)$ where $p(X|H_j)$ for j=0.1 is the probability density function for the hypothesis $H_j$ evaluated for the input X, for example by calculating the log-likelihood ratio $r(X)=\log p(X|H_0)-\log p(X|H_1)$. In the following, the natural logarithm is used, but it will be appreciated that other logarithms could be used (with the examples and equations updated accordingly). The value of $r(X)$ may be compared with a threshold $\theta$, and $H_0$ is accepted (i.e. it is concluded that the user $U_1$ is the predetermined user $U_D$) if $r(X)>\theta$, whereas $H_1$ is accepted and $H_0$ is rejected (i.e. it is concluded that the user $U_1$ is not the predetermined user $U_D$) if $r(X)<\theta$. It will be appreciated that the decision on whether to accept or reject $H_0$ if $r(X)=\theta$ is a design choice.

Determination of the likelihoods $p(X|H_0)$ and $p(X|H_1)$ may be based on models $\lambda_g$ and $\lambda_i$ respectively, where $\lambda_g$ is a first model in which input is obtained from the predetermined user $U_D$, and wherein $\lambda_i$ is a second model in which input is obtained from one or more users other than the predetermined user $U_D$, i.e. $\lambda_g$ is a model of the predetermined user $U_D$ and $\lambda_i$ is a model of one or more "imposters" (i.e. users other than the predetermined user $U_D$). The models $\lambda_g$ and $\lambda_i$ then represent the hypotheses $H_0$ and $H_1$ respectively. The models may then be used to calculate the likelihoods $p(X|H_0)$ and $p(X|H_1)$ as $p(X|\lambda_g)$ and $p(X|\lambda_i)$ respectively, so that a log-likelihood ratio can be calculated as $r(X)=\log p(X|\lambda_g)-\log p(X|\lambda_i)$.

Examples of, and the nature of, the models $\lambda_g$ and $\lambda_i$ shall be described later.

Given random variables $X_g$ and $X_i$ that represent, respectively, test inputs X of a "genuine" user (i.e. the predetermined user $U_D$) and of one or more "imposters" (i.e. users other than the predetermined user $U_D$), the random variables $r(X_g)$ and $r(X_i)$ may be assumed to have respective Gaussian distributions, i.e. $r(X_g) \sim \mathcal{N}(\mu_g, \sigma_g^2)$ and $r(X_i) \sim \mathcal{N}(\mu_i, \sigma_i^2)$. Examples of how the respective means $\mu_g$ and $\mu_i$ and the respective variances $\sigma_g^2$ and $\sigma_i^2$ a may be estimated shall be described later. The respective probability density functions $f_g$ and $f_i$ for the random variables $r(X_g)$ and $r(X_i)$ are then:

$$f_g(x|\mu_g, \sigma_g^2) = \frac{1}{\sqrt{2\pi\sigma_g^2}} e^{-\frac{(x-\mu_g)^2}{2\sigma_g^2}}$$

and $$f_i(x|\mu_i, \sigma_i^2) = \frac{1}{\sqrt{2\pi\sigma_i^2}} e^{-\frac{(x-\mu_i)^2}{2\sigma_i^2}}$$

Using the well-known error function $$\text{erf}(x) = \frac{1}{\sqrt{\pi}} \int_{-x}^{x} e^{-t^2} dt = \frac{2}{\sqrt{\pi}} \int_{0}^{x} e^{-t^2} dt,$$

the cumulative distribution functions $F_g$ and $F_i$ for the random variables $r(X_g)$ and $r(X_i)$ are:

$$F_g(x|\mu_g, \sigma_g^2) = Pr(r(X_g) \leq x) = \frac{1}{2} + \frac{1}{2}\text{erf}\left(\frac{x-\mu_g}{\sigma_g\sqrt{2}}\right)$$

and $$F_i(x|\mu_i, \sigma_i^2) = Pr(r(X_i) \leq x) = \frac{1}{2} + \frac{1}{2}\text{erf}\left(\frac{x-\mu_i}{\sigma_i\sqrt{2}}\right)$$

The analysis below assumes that the following design choice is made: $H_0$ is rejected if $r(X)=\theta$. However, as mentioned above, the skilled person will appreciate that this is a mere design choice and that the analysis below can be easily adapted to examples in which $H_0$ is accepted if $r(X)=\theta$.

A Type I error (or a false rejection or false positive) happens when $H_0$ is true but is rejected, i.e. the user $U_1$ being tested is the predetermined user $U_D$, but the biometric authentication incorrectly concludes that the user $U_1$ is not the predetermined user $U_D$. The probability, $p_{FP}$, of a Type I error may therefore be expressed as:

$$p_{FP}(t|\mu_g, \sigma_g^2) = Pr(r(X_g) \leq t) = \frac{1}{2} + \frac{1}{2}\text{erf}\left(\frac{t-\mu_g}{\sigma_g\sqrt{2}}\right)$$

(where t parameterizes this expression for $p_{FP}$ and represents the parameterized threshold $\theta$).

As mentioned above, $p_{FP}$ relates to the (in)convenience experienced by a genuine user—i.e. the user $U_1$ being tested is indeed the predetermined user $U_D$, but the biometric authentication incorrectly concludes that the user $U_1$ is not the predetermined user $U_D$ (and therefore is inconvenienced) with a probability of $p_{FP}$. The lower the value of $p_{FP}$, the greater the convenience for the genuine user.

A Type II error (or a false acceptance or false negative) happens when $H_0$ is false but is accepted, i.e. the user $U_1$ being tested is not the predetermined user $U_D$, but the biometric authentication incorrectly concludes that the user $U_1$ is the predetermined user $U_D$. The probability, $p_{FN}$, of a Type II error may therefore be expressed as:

$$p_{FN}(t|\mu_i, \sigma_i^2) = Pr(r(X_i) > t) = 1 - Pr(r(X_i) \leq t) = \frac{1}{2} - \frac{1}{2}\text{erf}\left(\frac{t-\mu_i}{\sigma_i\sqrt{2}}\right)$$

(where t parameterizes this expression for $p_{FN}$ and represents the parameterized threshold $\theta$).

As mentioned above, $p_{FN}$ relates to the security of the biometric authentication system/method—i.e. the user $U_1$ being tested is not the predetermined user $U_D$, but the biometric authentication incorrectly concludes that the user $U_1$ is the predetermined user $U_D$ (and security may be considered compromised) with a probability of $p_{FN}$. The lower the value of $p_{FN}$, the greater the security.

One or both of $p_{FP}$ and $p_{FN}$ may be used to set the value of $\theta$ for performing the test of $r(X)<\theta$. For example, with a focus on user convenience, a target value $\beta_{FP}>0$ for $p_{FP}$ may be chosen to be as low as desired, with a value of θ being chosen accordingly so that $$\beta_{FP} \geq p_{FP}(\theta \mid \mu_g, \sigma_g^2) = Pr(r(X_g) \leq \theta) = \frac{1}{2} + \frac{1}{2}\text{erf}\left(\frac{\theta - \mu_g}{\sigma_g\sqrt{2}}\right)$$

Likewise, with a focus on security, a target value $\beta_{FN}>0$ for $p_{FN}$ may be chosen to be as low as desired, with a value of B being chosen accordingly so that $$\beta_{FN} \geq p_{FN}(\theta \mid \mu_i, \sigma_i^2) =$$

$$Pr(r(X_i) > \theta) = 1 - Pr(r(X_i) \leq \theta) = \frac{1}{2} - \frac{1}{2}\text{erf}\left(\frac{\theta - \mu_i}{\sigma_i\sqrt{2}}\right)$$

The so-called Equal Error Rate (EER) may be used to define the value of θ and provides a measure of effectiveness of the biometric authentication. The value of B to achieve EER, namely $\theta_{EER}$, is the value of t for which $p_{FP}(t \mid \mu_g, \sigma_g^2) = p_{FN}(t \mid \mu_i, \sigma_i^2)$, and the EER is then defined as $p_{FP}(\theta_{EER} \mid \mu_g, \sigma_g^2)$. The lower the value of EER, the more secure and more user-convenient the biometric authentication is.

Figure 3:
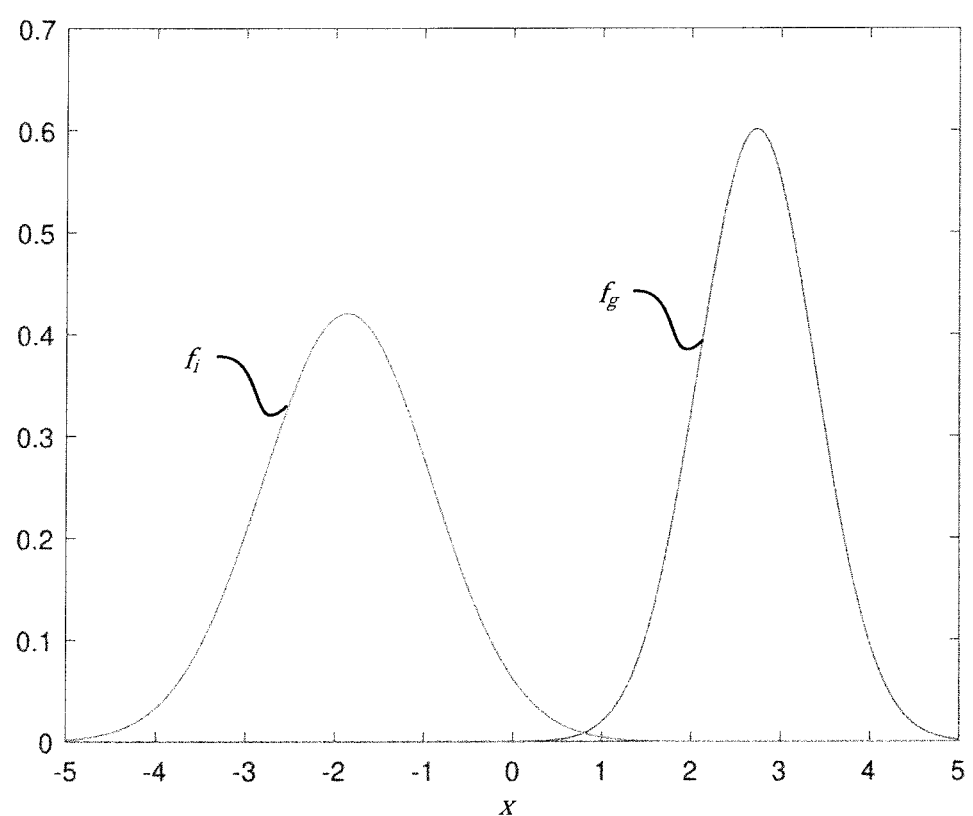
FIG. 3 illustrates two probability density functions $f_g$ and $f_i$.

Example 1: As an example of the above method of biometric authentication, consider the following values for the parameters for the two Gaussian distributions: $\mu_g=2.73$, $\sigma_g^2=0.44$, $\mu_i=-1.86$ and $\sigma_i^2=0.90$. FIG. 3 illustrates the corresponding probability density functions $f_g$ and $f_i$. $\theta_{EER}$ may be determined (e.g. numerically) to be $\theta_{EER}\approx 0.84$ and EER$\approx 0.0022$.

An enhancement on the above-described method for performing biometric authentication shall now be described. This enhancement enables greater security and/or greater user-convenience, as shall become apparent. The same underlying models $\lambda_g$ and $\lambda_i$ are used in this enhanced method of biometric authentication.

With this enhanced method of biometric authentication, instead of using just a single threshold θ for performing the test of $r(X)<\theta$, multiple thresholds are used, as set out below, with one or more tests being performed for a single biometric authentication. In particular, a first type of test (referred to herein as a first test) may be performed one or more times, up to a maximum number M times. A second type of test (referred to herein as a second test) may then be performed (if the first test has been performed M times and in dependence on the outcome of the $M^{th}$ first test). Thus, at most N tests are performed, where N=M+1. In the following, the parameter j is used to indicate the current test being performed, with j ranging from 1 to N and j being initialized to 1. The value of M is predetermined and can be any positive integer; thus, likewise, the value of N is predetermined and can be any positive integer greater than 1. In practice, it may be that the value of N is set, as this represented the maximum number of tests (be they first or second tests) that the user will need to undergo for a given biometric authentication, with the value of M being set, or determined, based on N as M=N−1. Some embodiments may be implemented to use a value for M without explicitly using a value for N (e.g. as discussed later with reference to FIG. 5); equally, some embodiments may be implemented to use a value for N without explicitly using a value for M; and some embodiments may be implemented to use a value for M and a value for N—this is a design choice.

In particular, the $j^{th}$ first test is performed in which $r(X^{(j)})$ is calculated for an input $X^{(j)}$ for the $j^{th}$ first test and: (a) if $r(X^{(j)})<\theta_L^{(j)}$ for a first threshold $\theta_L^{(j)}$ for the $j^{th}$ first test, then $H_1$ is accepted and $H_0$ is rejected (i.e. it is concluded that the user $U_1$ is not the predetermined user $U_D$); (b) if $r(X^{(j)})>\theta_R^{(j)}$ for a second threshold $\theta_R^{(j)}$ for the $j^{th}$ first test with $\theta_R^{(j)}>\theta_L^{(j)}$, then $H_0$ is accepted (i.e. it is concluded that the user $U_1$ is the predetermined user $U_D$); (c) if, however, $\theta_L^{(j)}<r(X^{(j)})<\theta_R^{(j)}$, then the conclusion of the first test is either that: (i) another first test is to be performed if j<M (in which case j will be incremented by 1 so that the $(j+1)^{th}$ first test is then performed); or (ii) a second test is to be performed if j=M (in which case, the second test will be the $N^{th}$ test that is performed)—thus, the first test is performed a maximum of M times and the second test is performed if the first test has been performed M times and $\theta_L^{(M)}<r(X^{(M)})<\theta_R^{(M)}$.

In some embodiments, $H_0$ is rejected at the $j^{th}$ first test if $r(X^{(j)})=\theta_L^{(j)}$, whereas in other embodiments, a further first test or the second test is performed as appropriate if $r(X^{(j)})=\theta_L^{(j)}$: this is a design choice. Likewise, in some embodiments, $H_0$ is accepted at the $j^{th}$ first test if $r(X^{(j)})=\theta_R^{(j)}$, whereas in other embodiments, a further first test or the second test is performed as appropriate if $r(X^{(j)})=\theta_R^{(j)}$: again, this is a design choice.

Each of the one or more first tests comprises obtaining a respective first input $X^{(j)}$. The first input $X^{(j)}$ may be obtained in the same way as the input X is obtained, as discussed above. The input $X^{(j)}$ is of the same type as the input X (i.e. they both relate to the same biological or biometric characteristics and can be analyzed based on the same models $\lambda_g$ and $\lambda_i$).

For the second test, $r(X^{(N)})$ is calculated and: (a) if $r(X^{(N)})<\theta^{(N)}$ for a third threshold $\theta^{(N)}$, then $H_1$ is accepted and $H_0$ is rejected (i.e. it is concluded that the user $U_1$ is not the predetermined user $U_D$); (b) if $r(X^{(N)})>\theta^{(N)}$ for the third threshold $\theta^{(N)}$, then $H_0$ is accepted (i.e. it is concluded that the user $U_1$ is the predetermined user $U_D$). In some embodiments, $H_0$ is accepted if $r(X^{(N)})=\theta^{(N)}$ whereas in other embodiments, $H_0$ is rejected if $r(X^{(N)})=\theta^{(N)}$: again, this is a design choice.

The second test comprises obtaining a second input $X^{(N)}$. The second input $X^{(N)}$ may be obtained in the same way as the input X is obtained, as discussed above. The second input $X^{(N)}$ is of the same type as the input X (i.e. they both relate to the same biological or biometric characteristics and can be analyzed based on the same models $\lambda_g$ and $\lambda_i$).

The analysis below assumes that the following design choices are made: $H_0$ is rejected at the $j^{th}$ first test if $r(X^{(j)})=\theta_L^{(j)}$ and at the second test if $r(X^{(N)})=\theta^{(N)}$, and a further first test or the second test is performed as appropriate if $r(X^{(j)})=\theta_R^{(j)}$. The analysis below also assumes that the random variables $r(X^{(j)})$ (for j=1, 2, . . . , N−1) and $r(X^{(N)})$ of each respective first input $X^{(j)}$ (for j=1, 2, . . . , N−1) and the second input $X^{(N)}$ respectively are independent, and that the random variables $r(X^{(j)})$ (for j=1, 2, . . . , N−1) and $r(X^{(N)})$ of each respective first input $X^{(j)}$ (for j=1, 2, . . . , N−1) and the second input $X^{(N)}$ that are associated with a single biometric authentication are identically distributed. In particular, as above, given random variables $X_g$ and $X_i$ that represent, respectively, test inputs $X^{(j)}$ (or $X^{(N)}$) of a "genuine" user (i.e. the predetermined user $U_D$) and of one or more "imposters" (i.e. users other than the predetermined user $U_D$), the random variables $r(X_g)$ and $r(X_i)$ may be assumed to have respective Gaussian distributions, i.e. $r(X_g) \sim \mathcal{N}(\mu_g, \sigma_g^2)$ and $r(X_i) \sim \mathcal{N}(\mu_i, \sigma_i^2)$. As previously mentioned, examples of how the respective means $\mu_g$ and $\mu_i$ and the respective variances $\sigma_g^2$ and $\sigma_i^2$ may be estimated shall be described later.

Accordingly, in embodiments in which the maximum number of tests N equals 2 (i.e. M=1), the probability $p_{FP}^{(2)}$ of a Type I error and the probability $p_{FN}^{(2)}$ of a Type II error are given by:

$$p_{FN}^{(2)}(t_L^{(1)}, t_R^{(1)}, t^{(2)} | \mu_g, \sigma_g^2) = Pr(r(X_g) > t_L^{(1)}) + Pr(t_L^{(1)} < r(X_g) \le t_R^{(1)}) \cdot Pr(r(X_g) > t^{(2)})$$

$$p_{FN}^{(2)}(t_L^{(1)}, t_R^{(1)}, t^{(2)} | \mu_i, \sigma_i^2) = Pr(r(X_i) > t_R^{(1)}) + Pr(t_L^{(1)} < r(X_i) \le t_R^{(1)}) \cdot Pr(r(X_i) > t^{(2)})$$

(where $t_L^{(1)}$, $t_R^{(1)}$, $t^{(2)}$ parameterize these expressions for $p_{FP}^{(2)}$ and $p_{FN}^{(2)}$, and represent the parameterized thresholds $\theta_L^{(1)}$, $\theta_R^{(1)}$ and $\theta^{(2)}$)
so that $$p_{FP}^{(2)}(t_L^{(1)}, t_R^{(1)}, t^{(2)} | \mu_g, \sigma_g^2) = \frac{1}{2} + \frac{1}{4}\mathrm{erf}\left(\frac{t_L^{(1)} - \mu_g}{\sigma_g \sqrt{2}}\right) + \frac{1}{4}\mathrm{erf}\left(\frac{t_R^{(1)} - \mu_g}{\sigma_g \sqrt{2}}\right) + \frac{1}{4}\mathrm{erf}\left(\frac{t^{(2)} - \mu_g}{\sigma_g \sqrt{2}}\right) \cdot \left(\mathrm{erf}\left(\frac{t_R^{(1)} - \mu_g}{\sigma_g \sqrt{2}}\right) - \mathrm{erf}\left(\frac{t_L^{(1)} - \mu_g}{\sigma_g \sqrt{2}}\right)\right)$$

$$p_{FN}^{(2)}(t_L^{(1)}, t_R^{(1)}, t^{(2)} | \mu_i, \sigma_i^2) = \frac{1}{2} - \frac{1}{4}\mathrm{erf}\left(\frac{t_L^{(1)} - \mu_i}{\sigma_i \sqrt{2}}\right) - \frac{1}{4}\mathrm{erf}\left(\frac{t_R^{(1)} - \mu_i}{\sigma_i \sqrt{2}}\right) - \frac{1}{4}\mathrm{erf}\left(\frac{t^{(2)} - \mu_i}{\sigma_i \sqrt{2}}\right) \cdot \left(\mathrm{erf}\left(\frac{t_R^{(1)} - \mu_i}{\sigma_i \sqrt{2}}\right) - \mathrm{erf}\left(\frac{t_L^{(1)} - \mu_i}{\sigma_i \sqrt{2}}\right)\right)$$

One or both of $p_{FP}^{(2)}$ and $p_{FN}^{(2)}$ may be used to set the values of $\theta_L^{(1)}$, $\theta_R^{(1)}$ and $\theta^{(2)}$ for performing the above-mentioned first and second tests. For example, with a focus on user convenience, a target value $\beta_{FP} > 0$ for $p_{FP}^{(2)}$ may be chosen to be as low as desired, with values of $\theta_L^{(1)}$, $\theta_R^{(1)}$ and $\theta^{(2)}$ being chosen accordingly so that $$\beta_{FP} \ge p_{FP}^{(2)}(\theta_L^{(1)}, \theta_R^{(1)}, \theta^{(2)} | \mu_g, \sigma_g^2)$$

There may be more than one triple of values $(\theta_L^{(1)}, \theta_R^{(1)}, \theta^{(2)})$ which satisfy this, any of which may be chosen. In some embodiments, the triple of values $(\theta_L^{(1)}, \theta_R^{(1)}, \theta^{(2)})$ is chosen so that value of $p_{FP}^{(2)}(\theta_L^{(1)}, \theta_R^{(1)}, \theta^{(2)} | \mu_i, \sigma_i^2)$ is as small as possible.

Example 2: Considering the same values of the parameters $\mu_g$, $\sigma_g^2$, $\mu_i$ and $\sigma_i^2$ as for Example 1 above, and setting $\beta_{FP} = 0.0022$, it can be determined that $p_{FP}^{(2)}(\theta_L^{(1)}, \theta_R^{(1)}, \theta^{(2)} | \mu_g, \sigma_g^2) \approx 0.0000081$ for $\theta_L^{(1)} \approx 0.68$, $\theta_R^{(1)} \approx 2.62$ and $\theta^{(2)} \approx 0.89$. The probability of a false negative in this example is around 273 times smaller than the corresponding value in Example 1, which is a considerable improvement for security.

Likewise, with a focus on security, a target value $\beta_{FN} > 0$ for $p_{FN}^{(2)}$ may be chosen to be as low as desired, with the values of $\theta_L^{(1)}$, $\theta_R^{(1)}$ and $\theta^{(2)}$ being chosen accordingly so that $$\beta_{FP} \ge p_{FP}^{(2)}(\theta_L^{(1)}, \theta_R^{(1)}, \theta^{(2)} | \mu_i, \sigma_i^2)$$

Again, there may be more than one triple of values $(\theta_L^{(1)}, \theta_R^{(1)}, \theta^{(2)})$ which satisfy this, any of which may be chosen. In some embodiments, the triple of values $(\theta_L^{(1)}, \theta_R^{(1)}, \theta^{(2)})$ is chosen so that the value of $p_{FP}^{(2)}(\theta_L^{(1)}, \theta_R^{(1)}, \theta^{(2)} | \mu_g, \sigma_g^2)$ is as small as possible.

Example 3: Considering the same values of the parameters $\mu_g$, $\sigma_g^2$, $\mu_i$ and $\sigma_i^2$ as for Example 1 above, and setting $\beta_{FN} = 0.0022$, it can be determined that $p_{FP}^{(2)}(\theta_L^{(1)}, \theta_R^{(1)}, \theta^{(2)} | \mu_g, \sigma_g^2) \approx 0.00000078$ for $\theta_L^{(1)} \approx -0.59$, $\theta_R^{(1)} \approx 1.20$ and $\theta^{(2)} \approx 0.14$. The probability of a false positive in this example is around 2,850 times smaller than the corresponding value in Example 1, which is a considerable improvement for the convenience of the genuine user.

An adapted EER approach could be used to set the values of $\theta_L^{(1)}$, $\theta_R^{(1)}$ and $\theta^{(2)}$. Let the function u be defined by:

$$u(t_L^{(1)}, t_R^{(1)}, t^{(2)} | \mu_g, \sigma_g^2, \mu_i, \sigma_i^2) = \max\{p_{FP}^{(2)}(t_L^{(1)}, t_R^{(1)}, t^{(2)} | \mu_g, \sigma_g^2), p_{FN}^{(2)}(t_L^{(1)}, t_R^{(1)}, t^{(2)} | \mu_i, \sigma_i^2)\}$$

and let $$ER_{minmax} = \min_{(t_L^{(1)}, t_R^{(1)}, t^{(2)}) \in \mathbb{R}^3} u(t_L^{(1)}, t_R^{(1)}, t^{(2)} | \mu_g, \sigma_g^2, \mu_i, \sigma_i^2)$$

then the values of $\theta_L^{(1)}$, $\theta_R^{(1)}$ and $\theta^{(2)}$ could be set to be values for $t_L^{(1)}$, $t_R^{(1)}$ and $t^{(2)}$ for which $ER_{minmax}$ is reached. Again, there may be more than one triple of values $(\theta_L^{(1)}, \theta_R^{(1)}, \theta^{(2)})$ which satisfy this, any of which may be chosen.

Example 4: Considering the same values of the parameters $\mu_g$, $\sigma_g^2$, $\mu_i$ and $\sigma_i^2$ as for Example 1 above, $ER_{minmax}$ may be determined numerically, with $ER_{minmax} \approx 0.00012$ for $\theta_L^{(1)} \approx 0.14$, $\theta_R^{(1)} \approx 1.97$ and $\theta^{(2)} \approx 0.57$. The value of $ER_{minmax}$ in this example is around 18 times smaller than the EER in Example 1, which is a considerable improvement for both the convenience of the genuine user and security.

It will be appreciated that other methods may be used to set the values of $\theta_L^{(1)}$, $\theta_R^{(1)}$ and $\theta^{(2)}$, depending, for example, on the desired balance between rates of false acceptances and false rejections.

In embodiments in which the maximum number of tests N equals 2 (i.e. M=1), the probability that exactly m tests are performed for m=1 and m=2, given that the first user $U_1$ is the "genuine" user (i.e. the predetermined user $U_D$) or that the first user $U_1$ is an "imposter" (i.e. a user other than the predetermined user $U_D$), are $p_g^{m\ tests}$ and $p_i^{m\ tests}$ respectively, where:

$$p_g^{1tests}(t_L^{(1)}, t_R^{(1)}, t^{(2)} | \mu_g, \sigma_g^2) = 1 - \frac{1}{2}\left(\mathrm{erf}\left(\frac{t_R^{(1)} - \mu_g}{\sigma_g \sqrt{2}}\right) - \mathrm{erf}\left(\frac{t_L^{(1)} - \mu_g}{\sigma_g \sqrt{2}}\right)\right)$$

$$p_g^{2tests}(t_L^{(1)}, t_R^{(1)}, t^{(2)} | \mu_g, \sigma_g^2) = \frac{1}{2}\left(\mathrm{erf}\left(\frac{t_R^{(1)} - \mu_g}{\sigma_g \sqrt{2}}\right) - \mathrm{erf}\left(\frac{t_L^{(1)} - \mu_g}{\sigma_g \sqrt{2}}\right)\right)$$

$$p_i^{1tests}(t_L^{(1)}, t_R^{(1)}, t^{(2)} | \mu_i, \sigma_i^2) = 1 - \frac{1}{2}\left(\mathrm{erf}\left(\frac{t_R^{(1)} - \mu_i}{\sigma_i \sqrt{2}}\right) - \mathrm{erf}\left(\frac{t_L^{(1)} - \mu_i}{\sigma_i \sqrt{2}}\right)\right)$$

$$p_i^{2tests}(t_L^{(1)}, t_R^{(1)}, t^{(2)} | \mu_i, \sigma_i^2) = \frac{1}{2}\left(\mathrm{erf}\left(\frac{t_R^{(1)} - \mu_i}{\sigma_i \sqrt{2}}\right) - \mathrm{erf}\left(\frac{t_L^{(1)} - \mu_i}{\sigma_i \sqrt{2}}\right)\right)$$

Note that $p_i^{m\ tests}$ may be viewed as relating, in part, to the security of the biometric authentication since an attacker/imposter may be able to obtain further information relating to the biometric authentication via the second test. To help mitigate this, some embodiments of the invention may impose a maximum number of consecutive times that the biometric authentication process, resulting in the second test being conducted, may be performed.

Note also that $p_g^{m\ tests}$ relates to the (in)convenience experienced by the genuine (predetermined) user $U_D$. It may, for example, be desirable to ensure that $p_g^{2\ tests}$ is at most a threshold value $\alpha$ for some $0 < \alpha < 1$ and then set the values of $\theta_L^{(1)}$, $\theta_R^{(1)}$ and $\theta^{(2)}$ to be values for $t_L^{(1)}$, $t_R^{(1)}$ and $t^{(2)}$ that achieve $ER_{minmax}(\alpha)$, where:

$$ER_{minmax}(\alpha) = \min_{\substack{(t_L^{(1)}, t_R^{(1)}, t^{(2)}) \in \mathbb{R}^3; \\ p_g^{2tests}(t_L^{(1)}, t_R^{(1)}, t^{(2)}|\mu_g, \sigma_g^2) \leq \alpha}} u(t_L^{(1)}, t_R^{(1)}, t^{(2)} | \mu_g, \sigma_g^2, \mu_i, \sigma_i^2)$$

i.e. $ER_{minmax}(\alpha)$ is $ER_{minmax}$ but with the minimization constrained to triples $(t_L^{(1)}, t_R^{(1)}, t^{(2)})$ for which $p_g^{2\ tests}(t_L^{(1)}, t_R^{(1)}, t^{(2)}|\mu_g, \sigma_g^2) \leq \alpha$.

Example 5: Considering the same values of the parameters $\mu_g$, $\sigma_g^2$, $\mu_i$ and $\sigma_i^2$ as for Example 2 above, and the same values of $\theta_L^{(1)}$, $\theta_R^{(1)}$ and $\theta^{(2)}$, $$p_g^{1\ tests}(\theta_L^{(1)}, \theta_R^{(1)}, \theta^{(2)}|\mu_g, \sigma_g^2) \approx 0.874$$

$$p_g^{2\ tests}(\theta_L^{(1)}, \theta_R^{(1)}, \theta^{(2)}|\mu_g, \sigma_g^2) \approx 0.126$$

$$p_i^{1\ tests}(\theta_L^{(1)}, \theta_R^{(1)}, \theta^{(2)}|\mu_i, \sigma_i^2) \approx 0.983$$

$$p_i^{2\ tests}(\theta_L^{(1)}, \theta_R^{(1)}, \theta^{(2)}|\mu_i, \sigma_i^2) \approx 0.017$$

Figure 4:
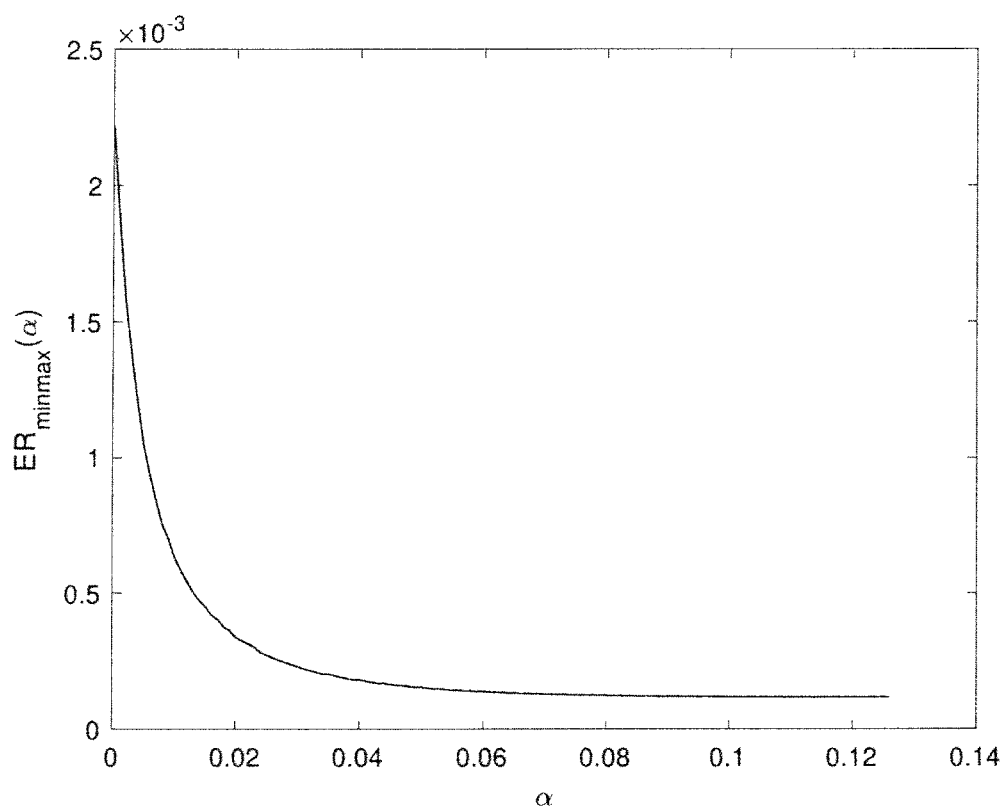
FIG. 4 illustrates an example plot for $ER_{minmax}(\alpha)$.

In particular, $ER_{minmax}(\alpha) < 0.00012$ if $0.126 < \alpha < 1$. For $0 < \alpha < 0.126$, the value of $ER_{minmax}(\alpha)$ may be determined numerically and is shown in FIG. 4. As a concrete example, if $\alpha = 0.01$ (i.e. if one wants the probability that the genuine user needs to perform the second test to be at most 0.01), then $ER_{minmax}(0.01) \approx 0.00063$. Corresponding threshold values are then: $\theta_L^{(1)} \approx 0.57$, $\theta_R^{(1)} \approx 1.20$ and $\theta^{(2)} \approx 1.09$. With these values, $$p_g^{1\ tests}(\theta_L^{(1)}, \theta_R^{(1)}, \theta^{(2)}|\mu_g, \sigma_g^2) \approx 0.990$$

$$p_g^{2\ tests}(\theta_L^{(1)}, \theta_R^{(1)}, \theta^{(2)}|\mu_g, \sigma_g^2) \approx 0.010$$

$$p_i^{1\ tests}(\theta_L^{(1)}, \theta_R^{(1)}, \theta^{(2)}|\mu_i, \sigma_i^2) \approx 0.995$$

$$p_i^{2\ tests}(\theta_L^{(1)}, \theta_R^{(1)}, \theta^{(2)}|\mu_i, \sigma_i^2) \approx 0.005$$

$ER_{minmax}(0.01)$ is around 3.5 times smaller than the EER in Example 1 above, so that good improvements in both the convenience of the genuine user and security are still achieved, even though the probability of the genuine user needing to perform a second test is bounded above by a small value of 0.01.

In the general scenario in which at most N tests are performed with $N > 1$, the probability $p_{FP}^{(N)}(t_L^{(1)}, t_R^{(1)}, \ldots, t_L^{(N-1)}, t_R^{(N-1)}, t^{(N)}|\mu_g, \sigma_g^2)$ of a Type I error can be calculated by setting $$p_{FP}^{(1)}(t^{(1)}|\mu_g, \sigma_g^2) = Pr(r(X_g) \leq t^{(1)})$$

and computing $$p_{FP}^{(j)}(t_L^{(1)}, t_R^{(1)}, \ldots, t_L^{(j-1)}, t_R^{(j-1)}, t^{(j)}|\mu_g, \sigma_g^2) = Pr(r(X_g) \leq t_L^{(1)}) + Pr(t_L^{(1)} < r(X_g) \leq t_R^{(1)}) \cdot p_{FP}^{(j-1)}(t_L^{(2)}, t_R^{(2)}, \ldots, t_L^{(j-1)}, t_R^{(j-1)}, t^{(j)}|\mu_g, \sigma_g^2)$$

for $j = 2, 3, \ldots, N$.

Likewise, in the general scenario in which at most N tests are performed with $N > 1$, the probability $p_{FN}^{(N)}(t_L^{(1)}, t_R^{(1)}, \ldots, t_L^{(N-1)}, t_R^{(N-1)}, t^{(N)}|\mu_g, \sigma_g^2)$ of a Type II error can also be calculated by setting $$p_{FN}^{(1)}(t^{(1)}|\mu_i, \sigma_i^2) = Pr(r(X_i) > t^{(1)})$$

and computing $$p_{FN}^{(j)}(t_L^{(1)}, t_R^{(1)}, \ldots, t_L^{(j-1)}, t_R^{(j-1)}, t^{(j)}|\mu_i, \sigma_i^2) = Pr(r(X_i) > t_R^{(1)}) + Pr(t_L^{(1)} < r(X_i) \leq t_R^{(1)}) \cdot p_{FN}^{(j-1)}(t_L^{(2)}, t_R^{(2)}, \ldots, t_L^{(j-1)}, t_R^{(j-1)}, t^{(j)}|\mu_i, \sigma_i^2)$$

for $j = 2, 3, \ldots, N$.

(where $t_L^{(1)}, t_R^{(1)}, \ldots, t_L^{(N-1)}, t_R^{(N-1)}, t^{(N)}$ parameterize these expressions for $p_{FP}^{(N)}$ and $p_{FN}^{(N)}$, and represent the parameterized thresholds $\theta_L^{(1)}, \theta_R^{(1)}, \ldots, \theta_L^{(N-1)}, \theta_R^{(N-1)}, \theta^{(N)}$).

One or both of $p_{FP}^{(N)}$ and $p_{FN}^{(N)}$ may be used to set the values of $\theta_L^{(1)}, \theta_R^{(1)}, \ldots, \theta_L^{(N-1)}, \theta_R^{(N-1)}, \theta^{(N)}$ for performing the above-mentioned at most N tests. For example, with a focus on user convenience, a target value $\beta_{FP} > 0$ for $p_{FP}^{(N)}$ may be chosen to be as low as desired, with values of $\theta_L^{(1)}, \theta_R^{(1)}, \ldots, \theta_L^{(N-1)}, \theta_R^{(N-1)}, \theta^{(N)}$ being chosen accordingly so that $$\beta_{FP} \geq p_{FP}^{(N)}(\theta_L^{(1)}, \theta_R^{(1)}, \ldots, \theta_L^{(N-1)}, \theta_R^{(N-1)}, \theta^{(N)}|\mu_g, \sigma_g^2)$$

There may be more than one vector of values $(\theta_L^{(1)}, \theta_R^{(1)}, \ldots, \theta_L^{(N-1)}, \theta_R^{(N-1)}, \theta^{(N)})$ which satisfy this, any of which may be chosen. In some embodiments, the vector of values $(\theta_L^{(1)}, \theta_R^{(1)}, \ldots, \theta_L^{(N-1)}, \theta_R^{(N-1)}, \theta^{(N)})$ may be chosen so that value of $p_{FN}^{(N)}(\theta_L^{(1)}, \theta_R^{(1)}, \ldots, \theta_L^{(N-1)}, \theta_R^{(N-1)}, \theta^{(N)}|\mu_i, \sigma_i^2)$ is as small as possible.

Likewise, with a focus on security, a target value $\beta_{FN} > 0$ for $p_{FN}^{(N)}$ may be chosen to be as low as desired, with the values of $\theta_L^{(1)}, \theta_R^{(1)}, \ldots, \theta_L^{(N-1)}, \theta_R^{(N-1)}, \theta^{(N)}$ being chosen accordingly so that $$\beta_{FN} \geq p_{FN}^{(N)}(\theta_L^{(1)}, \theta_R^{(1)}, \ldots, \theta_L^{(N-1)}, \theta_R^{(N-1)}, \theta^{(N)}|\mu_i, \sigma_i^2)$$

Again, there may be more than one vector of values $(\theta_L^{(1)}, \theta_R^{(1)}, \ldots, \theta_L^{(N-1)}, \theta_R^{(N-1)}, \theta^{(N)})$ which satisfy this, any of which may be chosen. In some embodiments, the vector of values $(\theta_L^{(1)}, \theta_R^{(1)}, \ldots, \theta_L^{(N-1)}, \theta_R^{(N-1)}, \theta^{(N)})$ may be chosen so that value of $p_{FP}^{(N)}(\theta_L^{(1)}, \theta_R^{(1)}, \ldots, \theta_L^{(N-1)}, \theta_R^{(N-1)}, \theta^{(N)}|\mu_g, \sigma_g^2)$ is as small as possible.

A further adapted EER approach could be used to set the values of $\theta_L^{(1)}, \theta_R^{(1)}, \ldots, \theta_L^{(N-1)}, \theta_R^{(N-1)}, \theta^{(N)}$. Let the function $v$ be defined by:

$$v(t_L^{(1)}, t_R^{(1)}, \ldots, t_L^{(N-1)}, t_R^{(N-1)}, t^{(N)}|\mu_g, \sigma_g^2, \mu_i, \sigma_i^2) = \max\{p_{FP}^{(N)}(t_L^{(1)}, t_R^{(1)}, \ldots, t_L^{(N-1)}, t_R^{(N-1)}, t^{(N)}|\mu_g, \sigma_g^2), p_{FN}^{(N)}(t_L^{(1)}, t_R^{(1)}, \ldots, t_L^{(N-1)}, t_R^{(N-1)}, t^{(N)}|\mu_i, \sigma_i^2)\}$$

and let $$ER_{minmax}^{(N)} = \min_{(t_L^{(1)}, t_R^{(1)}, \ldots, t_L^{(N-1)}, t_R^{(N-1)}, t^{(N)}) \in \mathbb{R}^{2N-1}} v(t_L^{(1)}, t_R^{(1)}, \ldots, t_L^{(N-1)}, t_R^{(N-1)}, t^{(N)} | \mu_g, \sigma_g^2, \mu_i, \sigma_i^2)$$

then the values of $\theta_L^{(1)}, \theta_R^{(1)}, \ldots, \theta_L^{(N-1)}, \theta_R^{(N-1)}, \theta^{(N)}$ could be set to be values for $t_L^{(1)}, t_R^{(1)}, \ldots, t_L^{(N-1)}, t_R^{(N-1)}, t^{(N)}$ for which $ER_{minmax}^{(N)}$ is reached. Again, there may be more than one vector of values $(\theta_L^{(1)}, \theta_R^{(1)}, \ldots, \theta_L^{(N-1)}, \theta_R^{(N-1)}, \theta^{(N)})$ which satisfy this, any of which may be chosen.

Again, it will be appreciated that other methods may be used to set the values of $\theta_L^{(1)}, \theta_R^{(1)}, \ldots, \theta_L^{(N-1)}, \theta_R^{(N-1)}, \theta^{(N)}$, depending, for example, on the desired balance between rates of false acceptances and false rejections.

In the general scenario in which at most N tests are performed with $N > 1$, the probability that exactly m tests are performed with $1 \leq m \leq N$, given that the first user $U_1$ is the "genuine" user (i.e. the predetermined user $U_D$) or that the first user $U_1$ is an "imposter" (i.e. a user other than the predetermined user $U_D$), are $p_g^{m\ tests}$ and $p_i^{m\ tests}$ respectively, where:

$$p_g^{mtests}(t_L^{(1)}, t_R^{(1)}, \ldots, t_L^{(N-1)}, t_R^{(N-1)}, t^{(N)} | \mu_g, \sigma_g^2) =$$

$$(Pr(r(X_g) \le t_L^{(m)}) + Pr(r(X_g) > t_R^{(m)})) \cdot \prod_{j=1}^{m-1} Pr(t_L^{(j)} < r(X_g) \le t_R^{(j)})$$

$$p_i^{mtests}(t_L^{(1)}, t_R^{(1)}, \ldots, t_L^{(N-1)}, t_R^{(N-1)}, t^{(N)} | \mu_i, \sigma_i^2) =$$

$$(Pr(r(X_i) \le t_L^{(m)}) + Pr(r(X_i) > t_R^{(m)})) \cdot \prod_{j=1}^{m-1} Pr(t_L^{(j)} < r(X_i) \le t_R^{(j)})$$

if $m < N$, and where:

$$p_g^{Ntests}(t_L^{(1)}, t_R^{(1)}, \ldots, t_L^{(N-1)}, t_R^{(N-1)}, t^{(N)} | \mu_g, \sigma_g^2) =$$

$$\prod_{j=1}^{N-1} Pr(t_L^{(j)} < r(X_g) \le t_R^{(j)})$$

$$p_i^{Ntests}(t_L^{(1)}, t_R^{(1)}, \ldots, t_L^{(N-1)}, t_R^{(N-1)}, t^{(N)} | \mu_i, \sigma_i^2) = \prod_{j=1}^{N-1} Pr(t_L^{(j)} < r(X_i) \le t_R^{(j)})$$

Example 6: Considering the same values of the parameters $\mu_g$, $\sigma_g^2$, $\mu_i$ and $\sigma_i^2$ as for Example 1 above, $ER_{minmax}^{(3)}$ may be determined numerically, with $ER_{minmax}^{(3)} \approx 0.000015$ for $$(\theta_L^{(1)}, \theta_R^{(1)}, \theta_L^{(2)}, \theta_R^{(2)}, \theta^{(3)} | \mu_g, \sigma_g^2) \approx (-0.20, 2.47, -0.07, 1.72, 0.43).$$

The value of $ER_{minmax}^{(3)}$ in this example is around 147 times smaller than the EER in Example 1 and around 8 times smaller than the value of $ER_{minmax}$ in Example 4, which is again a considerable improvement for both the convenience of the genuine user and security. For this example, $$p_g^{1\ tests}(\theta_L^{(1)}, \theta_R^{(1)}, \theta_L^{(2)}, \theta_R^{(2)}, \theta^{(3)} | \mu_g, \sigma_g^2) \approx 0.652$$

$$p_g^{2\ tests}(\theta_L^{(1)}, \theta_R^{(1)}, \theta_L^{(2)}, \theta_R^{(2)}, \theta^{(3)} | \mu_g, \sigma_g^2) \approx 0.325$$

$$p_g^{3\ tests}(\theta_L^{(1)}, \theta_R^{(1)}, \theta_L^{(2)}, \theta_R^{(2)}, \theta^{(3)} | \mu_g, \sigma_g^2) \approx 0.022$$

$$p_i^{1\ tests}(\theta_L^{(1)}, \theta_R^{(1)}, \theta_L^{(2)}, \theta_R^{(2)}, \theta^{(3)} | \mu_i, \sigma_i^2) \approx 0.960$$

$$p_i^{2\ tests}(\theta_L^{(1)}, \theta_R^{(1)}, \theta_L^{(2)}, \theta_R^{(2)}, \theta^{(3)} | \mu_i, \sigma_i^2) \approx 0.039$$

$$p_i^{3\ tests}(\theta_L^{(1)}, \theta_R^{(1)}, \theta_L^{(2)}, \theta_R^{(2)}, \theta^{(3)} | \mu_i, \sigma_i^2) \approx 0.001$$

Note that $p_i^{m\ tests}$ may be viewed as relating, in part, to the security of the biometric authentication since an attacker/imposter may be able to obtain further information relating to the biometric authentication via the more than one tests. To help mitigate this, some embodiments of the invention may impose a maximum number of consecutive times that the biometric authentication process, resulting in more than one test being conducted, may be performed.

Note also that $p_g^{m\ tests}$ relates to the (in)convenience experienced by the genuine (predetermined) user $U_D$. It may, for example, be desirable to ensure that $p_g^{1\ tests}$ is at least a threshold value $1-\alpha$ for some $0<\alpha<1$ and then set the values of $\theta_L^{(1)}, \theta_R^{(1)}, \ldots, \theta_L^{(N-1)}, \theta_R^{(N-1)}, \theta^{(N)}$ to be values for $t_L^{(1)}, t_R^{(1)}, \ldots, t_L^{(N-1)}, t_R^{(N-1)}, t^{(N)}$ that achieve $ER_{minmax}^{(N)}$ but with the minimization constrained to values for $t_L^{(1)}, t_R^{(1)}, \ldots, t_L^{(N-1)}, t_R^{(N-1)}, t^{(N)}$ for which $$p_g^{1\ tests}(t_L^{(1)}, t_R^{(1)}, \ldots, t_L^{(N-1)}, t_R^{(N-1)}, t^{(N)} | \mu_g, \sigma_g^2) > 1 - \alpha.$$

As mentioned above, the input X (and, likewise, the first input(s) $X^{(j)}$ for $j=1, 2, \ldots, M$ and the second input $X^{(N)}$) could be obtained or derived, for example, based on one or more of: one or more captured images of the user's face or eye(s); fingerprint data obtained from a fingerprint scanner; capture/recording of the user's voice (which may or may not be predetermined words spoken); etc. depending on which biometric characteristics are to be used by the authentication system. The following discussion uses the user's voice (e.g. in relation to spoken words) as an example of the generation and use of the models $\lambda_g$ and $\lambda_i$, and the derivation of their respective means $\mu_g$ and $\mu_i$ and respective variances $\sigma_g^2$ and $\sigma_i^2$. However, it will be appreciated that analogous approaches may be used in respect of other types of characteristics of the users and for different types of input X.

The input X may be a captured/recorded speech segment of a single speaker. A feature vector representing the input X may be generated from X. For example, the input X may be divided into a number of frames of a certain length, for which there may or may not be a certain amount of overlap between adjacent frames. For example, a frame may be 10 ms long and the amount of overlap between adjacent frames may be 50%. In some embodiments, certain frames may be discarded if those frames do not meet certain predetermined criteria—for example, a frame that does not contain speech or a frame that is too silent (i.e. that does not meet the criteria of being sufficiently loud) may be discarded. Put another way, frames that meet certain predetermined criteria may be selected for further processing. Feature extraction may then be applied to the frames (or the frames selected based on the above-mentioned criteria). This may be achieved in a variety of ways, such as the well-known feature extraction based on Mel-Frequency Cepstral Coefficients (MFCCs)—see L. R. Rabiner and B. H. Juang, *Fundamentals of Speech Recognition*, Englewood Cliffs, N.J., PTR Prentice Hall, 1993, the entire disclosure of which is incorporated herein by reference. If these (selected/remaining) frames are numbered 1 to K and if n denotes the number of MFCCs used, then this method outputs a feature vector $x_j \in \mathbb{R}^n$ for frame j with $j=1, 2, \ldots, K$. It will be appreciated that other methods of obtaining a set $\{x_j \in \mathbb{R}^n: j=1, 2, \ldots, K\}$ of K feature vectors from an input X may be used and, as mentioned above, alternative methods may be used when the input X is not a speech segment but, instead, relates to different characteristics of the user.

There are various types of models $\lambda_g$ and $\lambda_i$ which could be used for embodiments of the invention, such as a Hidden Markov Model. A Gaussian Mixture Model (GMM) is a well-known type of model—see, for example, https://en.wikipedia.org/wiki/Mixture_model, as well as D. A. Reynolds, T. F. Quatieri, and R. B. Dunn, *Speaker verification using adapted Gaussian mixture models*, Digital Signal Processing 10 (2000), pp. 19-41, the entire disclosures of which are incorporated herein by reference. To compute the likelihoods $p(X|\lambda_g)$ and $p(X|\lambda_i)$ using a GMM-based method, let $g_j: \mathbb{R}^n \to \mathbb{R}$ be Gaussian density functions with mean vector $\bar{\mu}_j \in \mathbb{R}^n$ and covariance matrix $\Sigma_j \in \mathbb{R}^{n \times n}$ $j=1, 2, \ldots, m$. The Gaussian mixture density function $p: \mathbb{R}^n \to \mathbb{R}$ may be defined as a weighted sum of these Gaussian density functions. If the weights are denoted by $w_j \in \mathbb{R}$ for $j=1, 2, \ldots, m$, then the GMM is characterized by the parameter set $\Delta = \{(w_j, \bar{\mu}_j, \Sigma_j) | 1 \le j \le m\}$ and $$p(x|\lambda) = \sum_{j=1}^{m} w_j g_j(x)$$

The Expectation-Maximization (EM) algorithm presented in A. P. Dempster, N. M. Laird, and D. B. Rubin, *Maximum likelihood from incomplete data via the EM algorithm*, Journal of the Royal Statistical Society: Series B (Methodological), vol. 39, no. 1 (1977), pp. 1-38 (, the entire disclosure of which are incorporated herein by reference) is a well-known method to estimate the parameters of λ. This algorithm takes a set of feature vectors, the value of m, the number of iterations used in the EM algorithm, and initial values for one Gaussian density function as inputs, and outputs the estimated parameters of λ.

Thus, during a training phase, a first set of feature vectors may be extracted from training speech segments provided by the genuine speaker $U_D$ (as discussed above). This first set may be input to the EM algorithm to estimate the parameters of $\lambda_g$. Likewise, a second set of feature vectors may be extracted from training speech segments of one or more imposters (i.e. users other than the genuine speaker $U_D$). This second set may be input to the EM algorithm to estimate the parameters of $\lambda_i$.

For a set of feature vectors $\{x_1, x_2, \ldots, x_T\}$ (where $x_j \in \mathbb{R}^n$ for $j=1, 2, \ldots, T$) extracted from a speech segment X, the log-likelihoods log $p(X|\lambda_g)$ and log $p(X|\lambda_i)$ may be computed as:

$$\log p(X \mid \lambda_g) = \sum_{j=1}^{T} \log p(x_j \mid \lambda_g)$$

$$\log p(X \mid \lambda_i) = \sum_{j=1}^{T} \log p(x_j \mid \lambda_i)$$

i.e. the likelihoods $p(X|\lambda_g)$ and $p(X|\lambda_i)$ may be computed as:

$$p(X \mid \lambda_g) = \prod_{j=1}^{T} p(x_j \mid \lambda_g)$$

$$p(X \mid \lambda_i) = \prod_{j=1}^{T} p(x_j \mid \lambda_i)$$

so that $r(X) = \log p(X|\lambda_g) - \log p(X|\lambda_i)$ may be calculated.

To estimate the mean $\mu_g$ and the variance $\sigma_g^2$, a set of $M_g$ speech segments $\{X_g^{(1)}, X_g^{(2)}, \ldots, X_g^{(M_g)}\}$ of the genuine speaker $U_D$ may be obtained, and $\mu_g$ and $\sigma_g^2$ may be estimated as:

$$\mu_g = \frac{1}{M_g} \sum_{j=1}^{M_g} r(X_g^{(j)})$$

$$\sigma_g^2 = \frac{1}{M_g - 1} \sum_{j=1}^{M_g} (r(X_g^{(j)}) - \mu_g)^2$$

Similarly, to estimate the mean $\mu_i$ and the variance $\sigma_i^2$, a set of $M_i$ speech segments $\{X_i^{(1)}, X_i^{(2)}, \ldots, X_i^{(M_i)}\}$ of one or more imposters (i.e. users other than the genuine speaker $U_D$) may be obtained, and $\mu_i$ and $\sigma_i^2$ may be estimated as:

$$\mu_i = \frac{1}{M_i} \sum_{j=1}^{M_i} r(X_i^{(j)})$$

$$\sigma_i^2 = \frac{1}{M_i - 1} \sum_{j=1}^{M_i} (r(X_i^{(j)}) - \mu_i)^2$$

Based on these estimated means $\mu_g$, $\mu_i$ and the variances $\sigma_g^2$, $\sigma_i^2$, the thresholds used for a testing phase (i.e. when performing the biometric authentication) may be calculated, as discussed above.

During the testing phase, a set of feature vectors $\{x_1, x_2, \ldots, x_S\}$ may be extracted from a test speech segment X. The log-likelihoods log $p(X|\lambda_g)$ and log $p(X|\lambda_i)$ and/or the likelihoods $p(X|\lambda_g)$ and $p(X|\lambda_i)$ may be computed as discussed above:

$$\log p(X \mid \lambda_g) = \sum_{j=1}^{S} \log p(x_j \mid \lambda_g)$$

$$\log p(X \mid \lambda_i) = \sum_{j=1}^{S} \log p(x_j \mid \lambda_i)$$

i.e.:

$$p(X \mid \lambda_g) = \prod_{j=1}^{S} p(x_j \mid \lambda_g)$$

$$p(X \mid \lambda_i) = \prod_{j=1}^{S} p(x_j \mid \lambda_i)$$

Thus, $r(X) = \log p(X|\lambda_g) - \log p(X|\lambda_i)$ may be calculated during the testing phase.

It will be appreciated that, in the above example discussion of audio speech segments, the input X was viewed as a speech segment recorded/captured from a user and from which a set of feature vectors $x \in \mathbb{R}^n$ is extracted for subsequent processing. However, input X could equally be viewed as the actual feature vectors $x \in \mathbb{R}^n$ obtained from the user via an audio recording/capture and subsequent feature extraction. Other ways of viewing the input X may equally apply (e.g. the input X may be a filtered/processed version of an audio recording/capture).

As discussed above, other types of model may be used for the models $\lambda_g$ and $\lambda_i$, and corresponding ways of initializing those models $\lambda_g$ and $\lambda_i$ during a training phase may be used accordingly. Indeed, the models $\lambda_g$ and $\lambda_i$ do not necessarily need to be of the same type. Since such modeling and training/initialization would be well-known to the skilled person, further detail on this shall not be given herein.

2—System Overview

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a microphone 125, a mouse (or other pointing device) 126, a camera (e.g. a webcam or an integrated camera) 127, a fingerprint reader/detector 128, and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

The network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. Additionally, it is possible that some components of the computer system 100 are not located in a personal computer, server system or a laptop and are part of a computer network connected to the personal computer, server system or a laptop via the network interface 116 and are located in a cloud of the computer network or are located in small computer devices such as mobile phones, smartphones and smart watches.

As discussed above, embodiments of the invention perform biometric authentication to determine, given an input X that is provided by (or that originated from) a first user $U_1$ and that is based on (or represents) one or more biological/biometric characteristics of the first user $U_1$, whether the first user $U_1$ is a predetermined or specific user $U_D$. The first user $U_1$ may be a user of the computer system 100. In embodiments in which biological/biometric characteristics of the user $U_1$ that are used to perform the biometric authentication relate to aspects/features of the user's face or eye(s), then the input X may be based on an image (of the face or eye(s) of the user $U_1$) captured via the camera 127. In embodiments in which biological/biometric characteristics of the user $U_1$ that are used to perform the biometric authentication relate to aspects/features of the user's voice, then the input X may be based on audio/sound (of the voice of the user $U_1$) captured/recorded via the microphone 125. In embodiments in which biological/biometric characteristics of the user $U_1$ that are used to perform the biometric authentication relate to aspects/features of the user's fingerprint(s), then the input X may be based on fingerprint data (from one or more fingers of the user $U_1$) captured via the fingerprint reader/detector 128. It will be appreciated that embodiments of the invention may make use of additional or alternative mechanisms (e.g. via the user input interface 114 and/or via the interface 110 and a device 122) for obtaining an input X from the first user $U_1$ that is based on one or more biological/biometric characteristics of the first user $U_1$.

In some embodiments of the invention, the biometric authentication is carried out at the device of the first user $U_1$, e.g. if the first user $U_1$ is attempting to gain access to, or login to, a mobile telephone, laptop, personal computer, etc.

Figure 2:
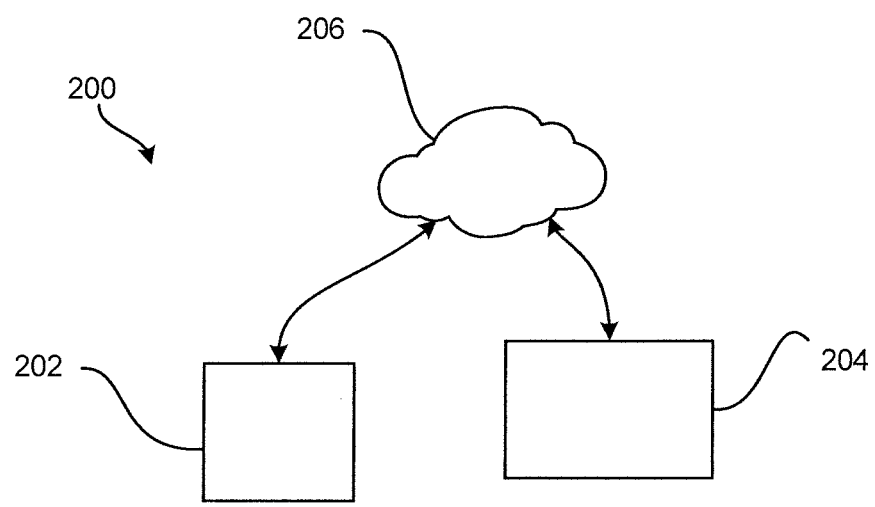
FIG. 2 schematically illustrates a system for performing biometric authentication according to some such embodiments.

However, in other embodiments (which may equally apply to situations in which the first user $U_1$ is attempting to gain access to, or login to, a mobile telephone, laptop, personal computer, etc.), at least some of the processing for the biometric authentication may be carried out separately from the device which initially received input from the user $U_1$. FIG. 2 schematically illustrates a system 200 for performing biometric authentication according to some such embodiments. The system 200 may comprise a user device 202, one or more servers 204 (and/or other devices/systems remote/separate from the user device 202) and one or more networks 206. For example, the system 200 may provide cloud-based biometric authentication services. The user device 202 and the one or more servers 204 may be arranged to communicate with each other over, or via, the network 206. The network 206 may be any kind of network suitable for transmitting or communicating data from any one of the user device 202 and the one or more servers 204 to the other of the user device 202 and the one or more servers 204. For example, the network 206 could comprise one or more of a local area network, a wide area network, a metropolitan area network, the internet, a wireless communications network, a cable network, a digital broadcast network, a satellite communication network, a telephone network, etc. The user device 202 and the one or more servers 204 may communicate over the network 206 via any suitable communication mechanism/protocol in order to communicate data with each other. However, it will be appreciated that other communication scenarios are possible. The user device 202 and the one or more servers 204 may each be, or may each comprise, one or more computer systems 100 as described above with reference to FIG. 1. For example, the user device 202 and/or the one or more servers 204 may be a personal computer, a server computer, a laptop, a mobile telephone, a tablet computer, a television, etc.

For example, with the system 200 shown in FIG. 2, the user device 202 may be used by the first user $U_1$, with the input X being obtained from the first user $U_1$ at the user device 202. The user device 202 may then be arranged to send/provide the obtained input X to the one or more servers 204 via the network 206 so that the one or more servers 204 may process the obtained input X and thereby perform the biometric authentication of the first user $U_1$. For example, the first user $U_1$ may be attempting to access a service provided by the one or more servers 204 (e.g. a financial/banking service) for which biometric authentication is required—the one or more servers 204 may be arranged to only provide such a service to the user $U_1$ if the identity of the user $U_1$ has been verified by biometric authentication based on the input X. Alternatively, the one or more servers 204 may simply be arranged to perform the biometric authentication based on the input X and then provide the result of the biometric authentication back to the user device 202 (for the user device 202 to process further accordingly).

It will be appreciated that other deployment scenarios are possible, with various stages of the processing for the biometric authentication being perform at different locations and/or by different entities.

3—Performance of Biometric Authentication

Figure 5:
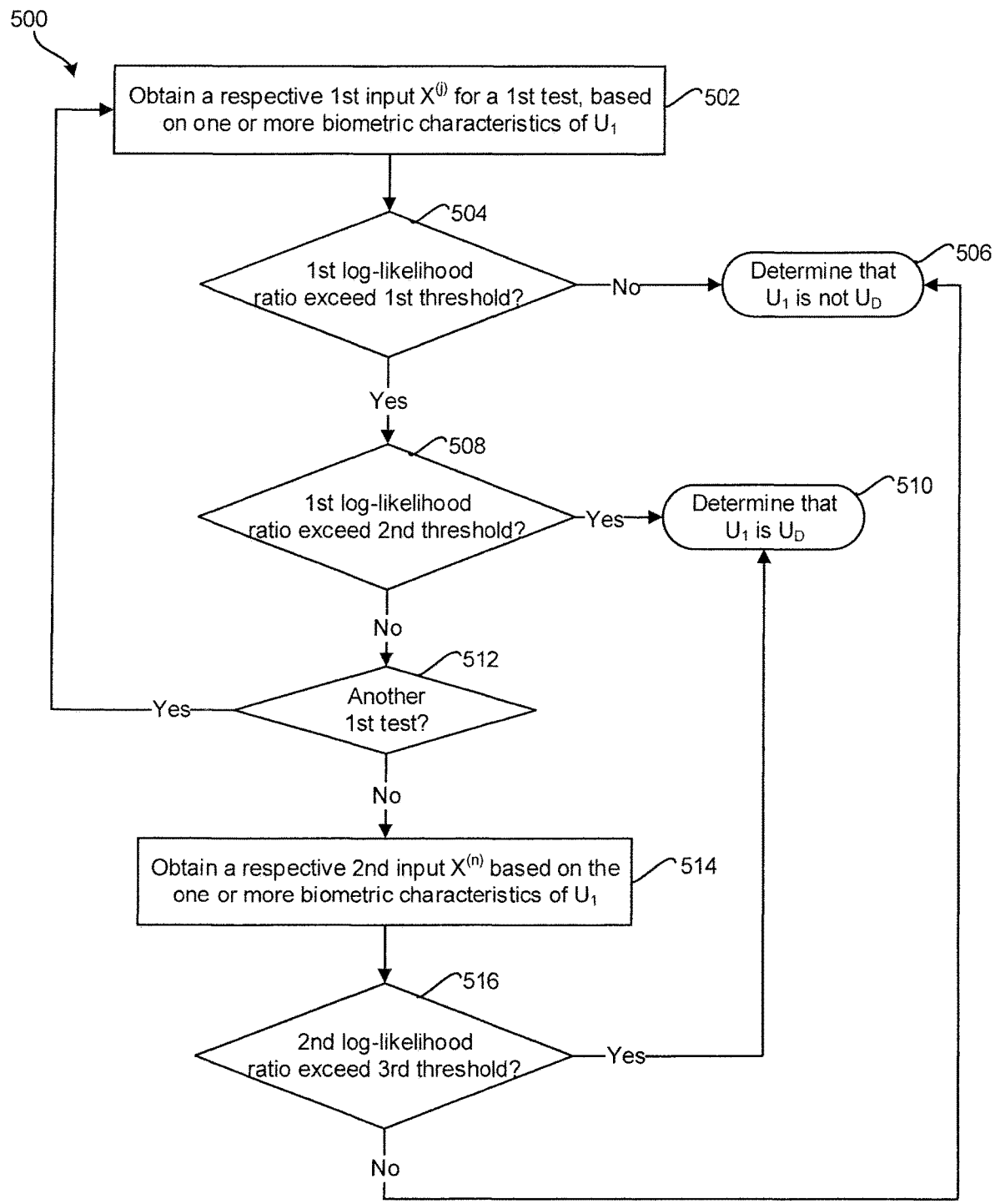
FIG. 5 is a flowchart illustrating a method of performing biometric authentication for a first user according to some embodiments of the invention.

FIG. 5 is a flowchart illustrating a method 500 of performing biometric authentication for a first user $U_1$ according to some embodiments of the invention. The method 500 may be performed by an authentication system (or module)—as mentioned above, the authentication system may take the form of a computer system 100 as illustrated in FIG. 1 (in isolation), a more distributed system 200 as illustrated in FIG. 2, or any other processing architecture capable of carrying out the method 500.

As discussed above, the method 500 may involve performing one or more first tests and, optionally (depending on the outcome of the one or more first tests) performing a second test. In the method 500, steps 502-510 are steps some or all of which may be performed for a first test, whilst steps 506, 510, 514 and 516 are steps some or all of which may be performed for the second test. It will be appreciated, however, that the first and second tests may be performed using a different set of steps and/or using these steps but in a different order. Either way, the outcome of the method 500 is either a determination at the step 506 that the first user $U_1$ is not the predetermined user $U_D$ or a determination at the step 510 that the first user $U_1$ is the predetermined user $U_D$.

At the step 502, the authentication system obtains a respective first input $X^{(j)}$ for the (current) first test being performed. This first input $X^{(j)}$ is obtained based on one or more biological/biometric characteristics of the first user $U_1$. The nature of the first input $X^{(j)}$, and methods and system components for obtaining the first input $X^{(j)}$, have been discussed above. The first user $U_1$ may be prompted, for example by a message displayed on the monitor 120, to interact with the authentication system so as to provide/generate the first input $X^{(j)}$ (e.g. by posing for an image to be captured by the camera 127, or by speaking so that audio may be recorded by the microphone 125, or by placing one or more fingers on the fingerprint reader/detector 128 so that fingerprint data may be obtained).

At the step 504, the authentication system determines whether or not a respective first log-likelihood ratio (for the (current) first test being performed) between/for a first likelihood and a second likelihood exceeds a first respective threshold (for the (current) first test being performed), where the first likelihood is a likelihood of obtaining the respective first input $X^{(j)}$ based on a first model in which input is obtained from the predetermined user $U_D$, and wherein the second likelihood is a likelihood of obtaining the respective first input $X^{(j)}$ based on a second model in which input is not obtained from the predetermined user $U_D$ (i.e. when input is obtained from one or more users other than the predetermined user $U_D$).

Thus, in some embodiments, the first and second models are $\lambda_g$ and $\lambda_i$ respectively and the first and second likelihoods are $p(X^{(j)}|\lambda_g)$ and $p(X^{(j)}|\lambda_i)$. The step 504 may involve calculating the respective first log-likelihood ratio $r(X^{(j)}) = \log p(X^{(j)}|\lambda_g) - \log p(X^{(j)}|\lambda_i)$ and identifying whether $r(X^{(j)}) \leq \theta_L^{(j)}$, for the first threshold $\theta_L^{(j)}$. Alternatively, as $$r(X^{(j)}) \leq \theta_L^{(j)} \Leftrightarrow \log\frac{p(X^{(j)}|\lambda_g)}{p(X^{(j)}|\lambda_i)} \leq \theta_L^{(j)} \Leftrightarrow \frac{p(X^{(j)}|\lambda_g)}{p(X^{(j)}|\lambda_i)} \leq e^{\theta_L^{(j)}},$$

the step 504 may involve calculating $$\frac{p(X^{(j)}|\lambda_g)}{p(X^{(j)}|\lambda_i)}$$

and identifying whether $$\frac{p(X^{(j)}|\lambda_g)}{p(X^{(j)}|\lambda_i)} \leq e^{\theta_L^{(j)}},$$

which is equivalent to determining whether $r(X^{(j)}) \leq \theta_L^{(j)}$. It will be appreciated that there are other ways in which this respective log-likelihood ratio may be tested against the respective first threshold (e.g. calculating a metric/value based on a ratio between the first likelihood and the second likelihood and comparing the metric/value to a threshold based on the respective first threshold), and that some embodiments may not therefore actually involve directly calculating this log-likelihood ratio.

In some embodiments, two separate models $\lambda_g$ and $\lambda_i$ may be implemented and maintained, and $p(X^{(j)}|\lambda_g)$ and $p(X^{(j)}|\lambda_i)$ may be calculated separately (so that, for example, $r(X^{(j)}) = \log p(X^{(j)}|\lambda_g) - \log p(X^{(j)}|\lambda_i)$ may then be calculated or $$\frac{p(X^{(j)}|\lambda_g)}{p(X^{(j)}|\lambda_i)}$$

may be calculated). In other embodiments, $\log p(X^{(j)}|\lambda_g) - \log p(X^{(j)}|\lambda_i)$, or the ratio $$\frac{p(X^{(j)} \mid \lambda_g)}{p(X^{(j)} \mid \lambda_i)},$$

or other relationships between the first and second likelihoods $p(X^{(j)}|\lambda_g)$ and $p(X^{(j)}|\lambda_i)$ may be calculated without calculating $p(X^{(j)}|\lambda_g)$ and/or $p(X^{(j)}|\lambda_i)$ explicitly, and the determination for the step 504 may be performed accordingly.

If the respective first log-likelihood ratio does not exceed the respective first threshold, then processing proceeds to the step 506 at which the authentication system determines that the first user $U_1$ is not the predetermined user $U_D$. Thus, when (or in response to) the respective first log-likelihood ratio does not exceed the respective first threshold, the authentication system determines that the first user $U_1$ is not the predetermined user $U_D$. Subsequent steps may then be performed according to the nature and purpose of the biometric authentication—for example, the first user $U_1$ may be denied access to a device, data or services for which the biometric authentication was required.

Otherwise, processing continues at the step 508 at which the authentication system determines whether or not the respective first log-likelihood ratio exceeds a respective second threshold, wherein the second threshold is greater than the first threshold. Continuing the above example, the step 508 may identify whether $r(X^{(j)}) > \theta_R^{(j)}$ for the second threshold $\theta_R^{(j)}$. As with the step 504, there are other ways in which the step 508 may be implemented (e.g. calculating a metric/value based on a ratio between the first likelihood and the second likelihood and comparing the metric/value to a threshold based on the respective second threshold). For example, the step 508 may involve determining whether $$\frac{p(X^{(j)} \mid \lambda_g)}{p(X^{(j)} \mid \lambda_i)} > e^{\theta_R^{(j)}}.$$

As with the step 504, for the step 508, in some embodiments, two separate models $\lambda_g$ and $\lambda_i$ may be implemented and maintained, and $p(X^{(j)}|\lambda_g)$ and $p(X^{(j)}|\lambda_i)$ may be calculated separately (so that, for example, $r(X^{(j)}) = \log p(X^{(j)}|\lambda_g) - \log p(X^{(j)}|\lambda_i)$ may then be calculated or $$\frac{p(X^{(j)} \mid \lambda_g)}{p(X^{(j)} \mid \lambda_i)}$$

may be calculated). In other embodiments, $\log p(X^{(j)}|\lambda_g) - \log p(X^{(j)}|\lambda_i)$, or the ratio $$\frac{p(X^{(j)} \mid \lambda_g)}{p(X^{(j)} \mid \lambda_i)},$$

or other relationships between the first and second likelihoods $p(X^{(j)}|\lambda_g)$ and $p(X^{(j)}|\lambda_i)$ may be calculated without calculating $p(X^{(j)}|\lambda_g)$ and/or $p(X^{(j)}|\lambda_i)$ explicitly, and the determination for the step 508 may be performed accordingly.

If the respective first log-likelihood exceeds the respective second threshold, then processing proceeds to the step 510 at which the authentication system determines that the first user $U_1$ is the predetermined user $U_D$. Thus, when (or in response to) the respective first log-likelihood exceeds the respective second threshold, the authentication system determines that the first user $U_1$ is the predetermined user $U_D$. Subsequent steps may then be performed according to the nature and purpose of the biometric authentication—for example, the first user $U_1$ may be permitted access to a device, data or services for which the biometric authentication was required.

Otherwise, processing continues at the step 512, at which the authentication system determines to perform another first test or determines to perform the second test. In particular, if the first test has been performed a predetermined maximum number of times, then processing continues at the step 514 in order to perform the second test; if, on the other hand, the first test has been performed fewer than the predetermined maximum number of times, then processing returns to the step 502 in order to perform a further first test. Thus, when the respective first log-likelihood ratio exceeds the respective first threshold and the respective first log-likelihood ratio does not exceed the respective second threshold, the step 512 determines to either (a) perform a further first test when a number of times that the first test has been performed is less than a predetermined maximum number of times or (b) perform the second test when the number of times that the first test has been performed equals the predetermined maximum number of times.

In some embodiments, the method 500 may involve using a counter j as an index for the current first test, i.e. to indicate the number of times that the first test has been performed. Thus, the method 500 may initialise, by initially setting the counter j to be 1. The step 512 may then involve testing whether j=M (where M is the above-mentioned predetermined maximum number of times for which the first test may be performed)—following the above-presented mathematical basis, in this embodiment M=N−1. If j=M then processing continues at the step 514; otherwise, the counter j may be increased by 1 and processing may return at the step 502. It will, however, be appreciated that there are many other ways of work out whether or not to perform an additional first test or whether to perform the second test—for example, the counter j could be initialised to the valve M (where M is the above-mentioned predetermined maximum number of times for which the first test may be performed)—following the above-presented mathematical basis, in this embodiment M=N−1. In this case, the step 512 may involve testing whether j=1: if j=1 then processing continues at the step 514; otherwise, the counter j may be decreased by 1 and processing may return at the step 502. Other mechanisms could be used likewise.

At the step 514 the authentication system obtains an input $X^{(N)}$ based on the one or more biological/biometric characteristics of the first user $U_1$. This may be performed in the same way in which the first input(s) $X^{(j)}$ was/were obtained at the step 502.

At the step 516, the authentication system determines whether or not a second log-likelihood ratio between/for a third likelihood and a fourth likelihood exceeds a third threshold, where the third likelihood is a likelihood of obtaining the input $X^{(N)}$ based on the first model (in which input is obtained from the predetermined user $U_D$), and where the fourth likelihood is a likelihood of obtaining the input $X^{(N)}$ based on the above second model (in which input is not obtained from the predetermined user $U_D$). Continuing the above example, the third and fourth likelihoods may be $p(X^{(N)}|\lambda_g)$ and $p(X^{(N)}|\lambda_i)$ respectively, as have been discussed above. The step 516 may involve calculating the second log-likelihood ratio $r(X^{(N)}) = \log p(X^{(N)}|\lambda_g) - \log p(X^{(N)}|\lambda_i)$ and identifying whether $r(X^{(N)}) > \theta^{(N)}$, for the third threshold $\theta^{(N)}$. Alternatively, $$r(X^{(N)}) > \theta^{(N)} \Leftrightarrow \log \frac{p(X^{(N)}|\lambda_g)}{p(X^{(N)}|\lambda_i)} > \theta^{(N)} \Leftrightarrow \frac{p(X^{(N)}|\lambda_g)}{p(X^{(N)}|\lambda_i)} > e^{\theta^{(N)}},$$

and so the step 516 may involve calculating $$\frac{p(X^{(N)}|\lambda_g)}{p(X^{(N)}|\lambda_i)}$$

and identifying whether $$\frac{p(X^{(N)}|\lambda_g)}{p(X^{(N)}|\lambda_i)} > e^{\theta^{(N)}},$$

which is equivalent to determining whether $r(X^{(N)}) > \theta^{(N)}$. It will be appreciated that there are other ways in which this log-likelihood ratio may be tested against the third threshold (e.g. calculating a metric/value based on a ratio between the third likelihood and the fourth likelihood and comparing the metric/value to a threshold based on the third threshold) and that some embodiments may not therefore actually involve directly calculating this log-likelihood ratio.

As with the steps 504 and 508, in some embodiments, two separate models $\lambda_g$ and $\lambda_i$ may be implemented and maintained, and $p(X^{(N)}|\lambda_g)$ and $p(X^{(N)}|\lambda_i)$ may be calculated separately (so that, for example, $r(X^{(N)}) = \log p(X^{(N)}|\lambda_g) - \log p(X^{(N)}|\lambda_i)$) may then be calculated $$\frac{p(X^{(N)}|\lambda_g)}{p(X^{(N)}|\lambda_i)}$$

or may be calculated). In other embodiments, $\log p(X^{(N)}|\lambda_g) - \log p(X^{(N)}|\lambda_i)$, or the ratio $$\frac{p(X^{(N)}|\lambda_g)}{p(X^{(N)}|\lambda_i)},$$

or other relationships between the third and fourth likelihoods $p(X^{(N)}|\lambda_g)$ and $p(X^{(N)}|\lambda_i)$ may be calculated without calculating $\log p(X^{(N)}|\lambda_g)$ and/or $\log p(X^{(N)}|\lambda_i)$ explicitly, and the determination for the step 516 may be performed accordingly.

If the second log-likelihood exceeds the third threshold, then processing proceeds to the step 510 at which the authentication system determines that the first user $U_1$ is the predetermined user $U_D$. Thus, when (or in response to) the second log-likelihood exceeds the third threshold, the authentication system determines that the first user $U_1$ is the predetermined user $U_D$. As above, subsequent steps may then be performed according to the nature and purpose of the biometric authentication—for example, the first user $U_1$ may be permitted access to a device, data or services for which the biometric authentication was required.

Otherwise, processing proceeds to the step 506 at which the authentication system determines that the first user $U_1$ is not the predetermined user $U_D$. Thus, when (or in response to) the second log-likelihood ratio does not exceed the third threshold, the authentication system determines that the first user $U_1$ is not the predetermined user $U_D$. Subsequent steps may then be performed according to the nature and purpose of the biometric authentication—for example, the first user $U_1$ may be denied access to a device, data or services for which the biometric authentication was required.

As mentioned above, in some embodiments, processing with never return to the step 502, as such embodiments may be arranged to perform exactly one first test (i.e. embodiments in which M=1).

It will be appreciated that the step 504 may be performed after the step 508.

Figure 6:
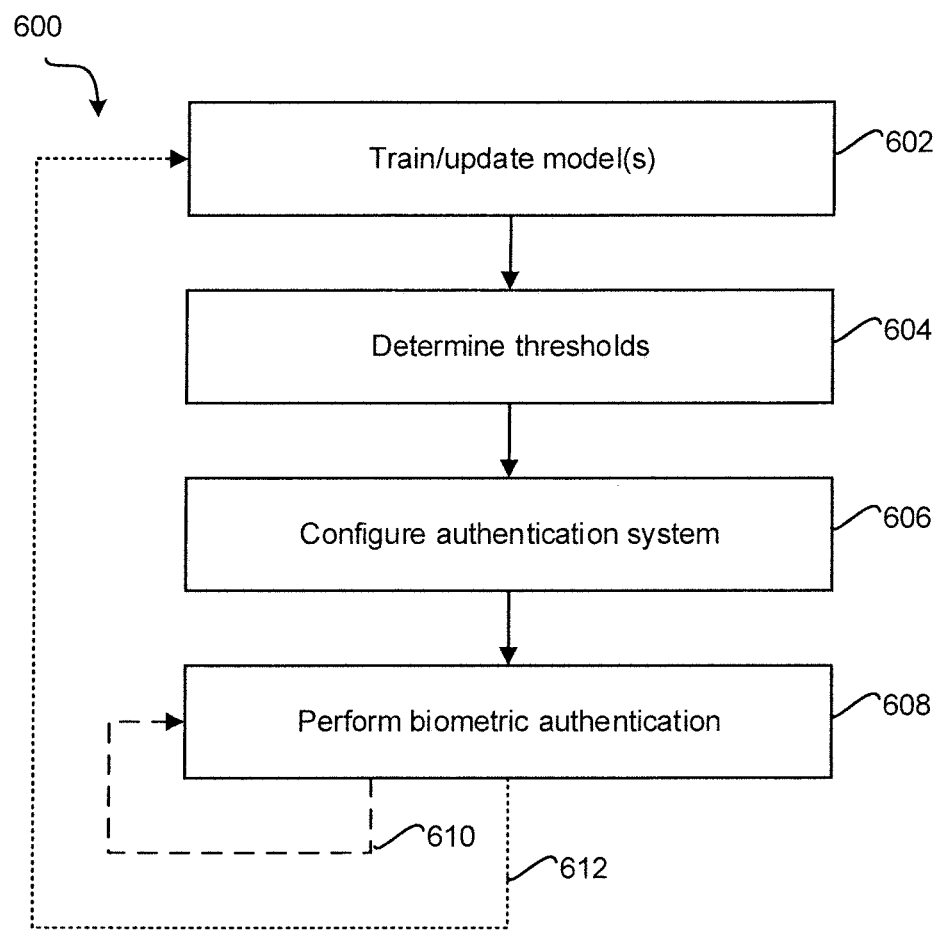
FIG. 6 is a flowchart illustrating a method for operating an authentication system according to some embodiments of the invention.

FIG. 6 is a flowchart illustrating a method 600 for operating an authentication system according to some embodiments of the invention.

At a step 602, one or more of the models used by the authentication system may be trained (or initialized) and/or updated. As discussed, the biometric authentication may be based on the models $\lambda_g$ and $\lambda_i$.

Details of such training/initialization have been set out above.

At a step 604, one or more of the above-mentioned thresholds for performing the biometric authentication may be determined. Techniques for determining the thresholds have been set out above. These thresholds may then be viewed as predetermined thresholds—i.e. they become predetermined once the model(s) have been trained (and potentially based on one or more targets for false acceptances and false rejections).

At a step 606, the authentication system may be configured. For example, the authentication system may be configured so as to use the thresholds determined at the step 604. Additionally, the authentication system may be configured to use any further updated parameters (e.g. if the predetermined maximum number M has been updated).

At a step 608, the authentication system may then perform biometric authentication, using the method 500 discussed above. As illustrated by a dashed line 610, the authentication system may perform multiple separate biometric authentications. As mentioned above, the number of consecutive times this may be performed when each separate biometric authentication involves more than one test may be limited to a predetermined maximum—should this maximum be reached, then one or more further measures may be taken (e.g. a system or device may become locked, thereby requiring a system administrator to unlock the system/device; the model $\lambda_g$ may need to be retrained; etc.).

As illustrated by a dotted line 612, processing may return to the step 602 at which the model(s) may be updated and/or re-trained. For example, the model $\lambda_g$ may be periodically updated or retrained based on additional biometric data obtained/collected from the predetermined user $U_D$ over time (e.g. based on the inputs $X^{(j)}$ and/or $X^{(N)}$ obtained from the user whenever the predetermined user undergoes the biometric authentication). In this way, the authentication system may adapt over time to the predetermined user, so that the model $\lambda_g$ may become more accurate and so that false rejections occur less frequently.

4—Modifications

It will be appreciated that the methods described have been shown as individual steps carried out in a specific order. However, the skilled person will appreciate that these steps may be combined or carried out in a different order whilst still achieving the desired result.

It will be appreciated that different statistical tests (other than the using the log-likelihood ratio) could be used instead.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of performing biometric authentication for a first user, the method comprising:
performing one or more first tests, wherein for each first test from among the one or more first tests, performing said first test comprises:
obtaining a respective first input for said first test based on one or more biometric characteristics of the first user, wherein the first input is a first biometric input from the first user;
determining that the first user is not a predetermined user when a respective first logarithmic-based log-likelihood ratio for a first likelihood and a second likelihood does not exceed a respective first threshold for said first test, wherein the first likelihood is a likelihood of obtaining the respective first input based on a first model in which a biometric input is obtained from the predetermined user, and wherein the second likelihood is a likelihood of obtaining the respective first input based on a second model different from the first model in which a biometric input is obtained from one or more users other than the predetermined user;
determining that the first user is the predetermined user when the respective first log-likelihood ratio exceeds a respective second threshold for said first test, the respective second threshold greater than the respective first threshold; and
when the respective first log-likelihood ratio exceeds the respective first threshold and the respective first log-likelihood ratio does not exceed the respective second threshold, either (a) determining to perform a further first test when a number of times that the first test has been performed is less than a predetermined maximum number of times or (b) determining to perform a second test when the number of times that the first test has been performed equals the predetermined maximum number of times;
wherein performing the second test comprises:
obtaining a second input for the second test based on the one or more biometric characteristics of the first user, wherein the second input is a second biometric input from the first user and is different from the first biometric input; and
determining that the first user is the predetermined user when a second logarithmic-based log-likelihood ratio for a third likelihood and a fourth likelihood exceeds a third threshold, wherein the third likelihood is a likelihood of receiving the respective second input based on the first model, and wherein the fourth likelihood is a likelihood of receiving the second input based on the second model;
determining that the first user is not the predetermined user when the second log-likelihood ratio does not exceed the third threshold.

2. The method of claim 1, wherein, for each first test, the respective first log-likelihood ratio is $r(X^{(j)}) = \log p(X^{(j)}|\lambda_g) - \log p(X^{(j)}|\lambda_i)$, where $X^{(j)}$ is the respective first input for said first test, $\lambda_g$ is the first model and $\lambda_i$ the second model.

3. The method of claim 2, wherein, for each first test, determining that the first user is not the predetermined user when the respective first log-likelihood ratio for the first likelihood and the second likelihood does not exceed the respective first threshold comprises one of:
(a) calculating $r(X^{(j)})$ and determining that the first user is not the predetermined user if $r(X^{(j)}) < \theta_L^{(j)}$, where $\theta_L^{(j)}$ is a respective predetermined threshold for the first test; or
(b) calculating $$\frac{p(X^{(j)}|\lambda_g)}{p(X^{(j)}|\lambda_i)}$$

and determining that the first user is not the predetermined user $$\frac{p(X|\lambda_g)}{p(X|\lambda_i)} < e^{\theta_L^{(j)}},$$

where $\theta_L^{(j)}$ is a respective predetermined threshold for the first test; or (c) calculating a metric based on a ratio between the first likelihood and the second likelihood and comparing the metric to a threshold based on the respective first threshold.

4. The method of claim 2, wherein, for each first test, determining that the first user is the predetermined user when the respective first log-likelihood ratio exceeds the respective second threshold comprises one of:

(a) calculating $r(X^{(j)})$ and determining that the first user is the predetermined user if $r(X^{(j)}) > \theta_R^{(j)}$, where $\theta_R^{(j)}$ is a respective predetermined threshold for the first test; or (b) calculating $$\frac{p(X^{(j)}|\lambda_g)}{p(X^{(j)}|\lambda_i)}$$

and determining that the first user is the predetermined user if $$\frac{p(X^{(j)}|\lambda_g)}{p(X^{(j)}|\lambda_i)} > e^{\theta_R^{(j)}},$$

where $\theta_R^{(j)}$ is a respective predetermined threshold for the first test; or (c) calculating a metric based on a ratio between the first likelihood and the second likelihood and comparing the metric to a threshold based on the respective second threshold.

5. The method of claim 1, wherein the second log-likelihood ratio is $r(X^{(N)}) = \log p(X^{(N)}|\lambda_g) - \log p(X^{(N)}|\lambda_i)$, where $X^{(N)}$ is the second input, $\lambda_g$ is the first model and $\lambda_i$ the second model.

6. The method of claim 5, wherein determining that the first user is the predetermined user when the second log-likelihood ratio for the third likelihood and the fourth likelihood exceeds the third threshold comprises one of:

(a) calculating $r(X^{(N)})$ and determining that the first user is the predetermined user if $r(X^{(N)}) > \theta^{(N)}$, where $\theta^{(N)}$ is a predetermined threshold; or (b) calculating $$\frac{p(X^{(N)}|\lambda_g)}{p(X^{(N)}|\lambda_i)}$$

and determining that the first user is the predetermined user if $$\frac{p(X^{(N)}|\lambda_g)}{p(X^{(N)}|\lambda_i)} > e^{\theta^{(N)}},$$

where $\theta^{(N)}$ is a predetermined threshold; or (c) calculating a metric based on a ratio between the third likelihood and the fourth likelihood and comparing the metric to a threshold based on the third threshold.

7. The method of claim 1, wherein the one or more biometric characteristics are based on one or more of: a face of the first user; a voice of the first user; one or more fingerprints of the first user; one or more eyes of the first user.

8. A system arranged to perform biometric authentication for a first user, the system comprising:
at least one memory; and
at least one processor configured to:
  perform one or more first tests, wherein for each first test from among the one or more first tests, performing said first test comprises:
    obtaining a respective first input for said first test based on one or more biometric characteristics of the first user, wherein the first input is a first biometric input from the first user;
    determining that the first user is not a predetermined user when a respective first logarithmic-based log-likelihood ratio for a first likelihood and a second likelihood does not exceed a respective first threshold for said first test, wherein the first likelihood is a likelihood of obtaining the respective first input based on a first model in which a biometric input is obtained from the predetermined user, and wherein the second likelihood is a likelihood of obtaining the respective first input based on a second model different from the first model in which a biometric input is obtained from one or more users other than the predetermined user;
    determining that the first user is the predetermined user when the respective first log-likelihood ratio exceeds a respective second threshold for said first test, the respective second threshold greater than the respective first threshold; and
  when the respective first log-likelihood ratio exceeds the respective first threshold and the respective first log-likelihood ratio does not exceed the respective second threshold, either (a) determining to perform a further first test when a number of times that the first test has been performed is less than a predetermined maximum number of times or (b) determining to perform a second test when the number of times that the first test has been performed equals the predetermined maximum number of times;
  wherein performing the second test comprises:
    obtaining a second input for the second test based on the one or more biometric characteristics of the first user, wherein the second input is a second biometric input from the first user and is different from the first biometric input; and
    determining that the first user is the predetermined user when a second logarithmic-based log-likelihood ratio for a third likelihood and a fourth likelihood exceeds a third threshold, wherein the third likelihood is a likelihood of receiving the respective second input based on the first model, and wherein the fourth likelihood is a likelihood of receiving the second input based on the second model;

determining that the first user is not the predetermined user when the second log-likelihood ratio does not exceed the third threshold.

9. The system of claim 8, wherein, for each first test, the respective first log-likelihood ratio is $r(X^{(j)})=\log p(X^{(j)}|\lambda_g)-\log p(X^{(j)}|\lambda_i)$, where $X^{(j)}$ is the respective first input for said first test, $\lambda_g$ is the first model and $\lambda_i$ the second model.

10. The system of claim 9, wherein, for each first test, determining that the first user is not the predetermined user when the respective first log-likelihood ratio for the first likelihood and the second likelihood does not exceed the respective first threshold comprises one of:
  (a) calculating $r(X^{(j)})$ and determining that the first user is not the predetermined user if $r(X^{(j)})<\theta_L^{(j)}$, where $\theta_L^{(j)}$ is a respective predetermined threshold for the first test; or
  (b) calculating $$\frac{p(X^{(j)}|\lambda_g)}{p(X^{(j)}|\lambda_i)}$$

and determining that the first user is not the predetermined user $$\frac{p(X|\lambda_g)}{p(X|\lambda_i)} < e^{\theta_L^{(j)}},$$

if where $\theta_L^{(j)}$ is a respective predetermined threshold for the first test; or
  (c) calculating a metric based on a ratio between the first likelihood and the second likelihood and comparing the metric to a threshold based on the respective first threshold.

11. The system of claim 9, wherein, for each first test, determining that the first user is the predetermined user when the respective first log-likelihood ratio exceeds the respective second threshold comprises one of:
  (a) calculating $r(X^{(j)})$ and determining that the first user is the predetermined user if $r(X^{(j)})>\theta_R^{(j)}$, where $\theta_R^{(j)}$ is a respective predetermined threshold for the first test; or
  (b) calculating $$\frac{p(X^{(j)}|\lambda_g)}{p(X^{(j)}|\lambda_i)}$$

and determining that the first user is the predetermined user if $$\frac{p(X^{(j)}|\lambda_g)}{p(X^{(j)}|\lambda_i)} > e^{\theta_R^{(j)}},$$

where $\theta_R^{(j)}$ is a respective predetermined threshold for the first test; or
  (c) calculating a metric based on a ratio between the first likelihood and the second likelihood and comparing the metric to a threshold based on the respective second threshold.

12. The system of claim 8, wherein the second log-likelihood ratio is $r(X^{(N)})=\log p(X^{(N)}|\lambda_g)-\log p(X^{(N)}|\lambda_i)$, where $X^{(N)}$ is the second input, $\lambda_g$ is the first model and $\lambda_i$ the second model.

13. The system of claim 12, wherein determining that the first user is the predetermined user when the second log-likelihood ratio for the third likelihood and the fourth likelihood exceeds the third threshold comprises one of:
  (a) calculating $r(X^{(N)})$ and determining that the first user is the predetermined user if $r(X^{(N)})>\theta^{(N)}$, where $\theta^{(N)}$ is a predetermined threshold; or
  (b) calculating $$\frac{p(X^{(N)}|\lambda_g)}{p(X^{(N)}|\lambda_i)}$$

and determining that the first user is the predetermined user if $$\frac{p(X^{(N)}|\lambda_g)}{p(X^{(N)}|\lambda_i)} > e^{\theta^{(N)}},$$

where $\theta^{(N)}$ is a predetermined threshold; or
  (c) calculating a metric based on a ratio between the third likelihood and the fourth likelihood and comparing the metric to a threshold based on the third threshold.

14. The system according to claim 8, wherein the one or more biometric characteristics are based on one or more of: a face of the first user; a voice of the first user; one or more fingerprints of the first user; one or more eyes of the first user.

15. A non-transitory computer readable medium storing a computer program which, when executed by one or more processors, causes the one or more processors to perform a method of biometric authentication for a first user, the method comprising:
  performing one or more first tests, wherein for each first test from among the one or more first tests, performing said first test comprises:
    obtaining a respective first input for said first test based on one or more biometric characteristics of the first user, wherein the first input is a first biometric input from the first user;
    determining that the first user is not a predetermined user when a respective first logarithmic-based log-likelihood ratio for a first likelihood and a second likelihood does not exceed a respective first threshold for said first test, wherein the first likelihood is a likelihood of obtaining the respective first input based on a first model in which a biometric input is obtained from the predetermined user, and wherein the second likelihood is a likelihood of obtaining the respective first input based on a second model different from the first model in which a biometric input is obtained from one or more users other than the predetermined user;
    determining that the first user is the predetermined user when the respective first log-likelihood ratio exceeds a respective second threshold for said first test, the respective second threshold greater than the respective first threshold; and
    when the respective first log-likelihood ratio exceeds the respective first threshold and the respective first log-likelihood ratio does not exceed the respective second threshold, either (a) determining to perform a further first test when a number of times that the first test has been performed is less than a predetermined maximum number of times or (b) determining to perform a second test when the number of times that the first test has been performed equals the predetermined maximum number of times;
wherein performing the second test comprises:
obtaining a second input for the second test based on the one or more biometric characteristics of the first user, wherein the second input is a second biometric input from the first user and is different from the first biometric input; and
determining that the first user is the predetermined user when a second logarithmic-based log-likelihood ratio for a third likelihood and a fourth likelihood exceeds a third threshold, wherein the third likelihood is a likelihood of receiving the respective second input based on the first model, and wherein the fourth likelihood is a likelihood of receiving the second input based on the second model;
determining that the first user is not the predetermined user when the second log-likelihood ratio does not exceed the third threshold.

16. The non-transitory computer readable medium of claim 15, wherein, for each first test, the respective first log-likelihood ratio is $r(X^{(j)}) = \log p(X^{(j)}|\lambda_g) - \log p(X^{(j)}|\lambda_i)$, where $X^{(j)}$ is the respective first input for said first test, $\lambda_g$ is the first model and $\lambda_i$ the second model.

17. The non-transitory computer readable medium of claim 16, wherein, for each first test, determining that the first user is not the predetermined user when the respective first log-likelihood ratio for the first likelihood and the second likelihood does not exceed the respective first threshold comprises one of:
(a) calculating $r(X^{(j)})$ and determining that the first user is not the predetermined user if $r(X^{(j)}) < \theta_L^{(j)}$, where $\theta_L^{(j)}$ is a respective predetermined threshold for the first test; or
(b) calculating $$\frac{p(X^{(j)}|\lambda_g)}{p(X^{(j)}|\lambda_i)}$$

and determining that the first user is not the predetermined user $$\frac{p(X|\lambda_g)}{p(X|\lambda_i)} < e^{\theta_L^{(j)}},$$

where $\theta_L^{(j)}$ is a respective predetermined threshold for the first test; or
(c) calculating a metric based on a ratio between the first likelihood and the second likelihood and comparing the metric to a threshold based on the respective first threshold.

18. The non-transitory computer readable medium of claim 16, wherein, for each first test, determining that the first user is the predetermined user when the respective first log-likelihood ratio exceeds the respective second threshold comprises one of:

(a) calculating $r(X^{(j)})$ and determining that the first user is the predetermined user if $r(X^{(j)}) > \theta_R^{(j)}$, where $\theta_R^{(j)}$ is a respective predetermined threshold for the first test; or
(b) calculating $$\frac{p(X^{(j)}|\lambda_g)}{p(X^{(j)}|\lambda_i)}$$

and determining that the first user is the predetermined user if $$\frac{p(X^{(j)}|\lambda_g)}{p(X^{(j)}|\lambda_i)} > e^{\theta_R^{(j)}},$$

where $\theta_R^{(j)}$ is a respective predetermined threshold for the first test; or
(c) calculating a metric based on a ratio between the first likelihood and the second likelihood and comparing the metric to a threshold based on the respective second threshold.

19. The non-transitory computer readable medium of claim 15, wherein the second log-likelihood ratio is $r(X^{(N)}) = \log p(X^{(N)}|\lambda_g) - \log p(X^{(N)}|\lambda_i)$, where $X^{(N)}$ is the second input, $\lambda_g$ is the first model and $\lambda_i$ the second model.

20. The non-transitory computer readable medium of claim 19, wherein determining that the first user is the predetermined user when the second log-likelihood ratio for the third likelihood and the fourth likelihood exceeds the third threshold comprises one of:
(a) calculating $r(X^{(N)})$ and determining that the first user is the predetermined user if $r(X^{(N)}) > \theta^{(N)}$, where $\theta^{(N)}$ is a predetermined threshold; or
(b) calculating $$\frac{p(X^{(N)}|\lambda_g)}{p(X^{(N)}|\lambda_i)}$$

and determining that the first user is the predetermined user if $$\frac{p(X^{(N)}|\lambda_g)}{p(X^{(N)}|\lambda_i)} > e^{\theta^{(N)}},$$

where $\theta^{(N)}$ is a predetermined threshold; or
(c) calculating a metric based on a ratio between the third likelihood and the fourth likelihood and comparing the metric to a threshold based on the third threshold.

21. The non-transitory computer readable medium claim 15, wherein the one or more biometric characteristics are based on one or more of: a face of the first user; a voice of the first user; one or more fingerprints of the first user; one or more eyes of the first user.

* * * * *